(12) United States Patent
Kunikyo

(10) Patent No.: US 12,086,870 B2
(45) Date of Patent: Sep. 10, 2024

(54) INFORMATION PROCESSING METHOD, PROGRAM, AND TERMINAL

(71) Applicant: LY Corporation, Tokyo (JP)

(72) Inventor: Masaki Kunikyo, Tokyo (JP)

(73) Assignee: LY Corporation, Tokyo (JP)

( * ) Notice: Subject to any disclaimer, the term of this patent is extended or adjusted under 35 U.S.C. 154(b) by 322 days.

(21) Appl. No.: 17/552,142

(22) Filed: Dec. 15, 2021

(65) Prior Publication Data

US 2022/0108383 A1 Apr. 7, 2022

Related U.S. Application Data

(63) Continuation of application No. PCT/JP2020/015891, filed on Apr. 8, 2020.

(30) Foreign Application Priority Data

Jun. 28, 2019 (JP) ................................ 2019-122147

(51) Int. Cl.
G06Q 30/00 (2023.01)
G06Q 30/0601 (2023.01)
G06V 20/20 (2022.01)

(52) U.S. Cl.
CPC ......... *G06Q 30/0643* (2013.01); *G06V 20/20* (2022.01)

(58) Field of Classification Search
CPC ............................................. G06Q 30/06–08
See application file for complete search history.

(56) References Cited

U.S. PATENT DOCUMENTS

| 10,147,135 | B2 * | 12/2018 | Wishne | G06T 19/20 |
|---|---|---|---|---|
| 11,024,079 | B1 * | 6/2021 | Chuah | G06T 7/246 |
| 2008/0071559 | A1 | 3/2008 | Arrasvuori | |
| 2009/0226113 | A1 * | 9/2009 | Matsumoto | G06V 20/36 382/284 |
| 2018/0211444 | A1 * | 7/2018 | Shaviv | G06T 19/006 |
| 2019/0266168 | A1 * | 8/2019 | DiBenedetto | G06F 16/24578 |

FOREIGN PATENT DOCUMENTS

| JP | 2004-318359 A | 11/2004 |
|---|---|---|
| JP | 2013-196426 A | 9/2013 |
| JP | 2015-141696 A | 8/2015 |
| JP | 2018-018382 A | 2/2018 |
| JP | 6391206 B1 | 9/2018 |

(Continued)

OTHER PUBLICATIONS

Office Action dated May 10, 2022, issued by the Japanese Patent Office in Japanese Application No. 2019-122147.

(Continued)

*Primary Examiner* — Ethan D Civan
(74) *Attorney, Agent, or Firm* — Sughrue Mion, PLLC

(57) ABSTRACT

An information processing method, and a terminal and a computer-readable storage medium for processing information are provided. The information processing method includes: acquiring measurement data obtained by measuring a product area contained in a captured image; and notifying, a user of the terminal, of second information of at least one first product that is selected, based on the measurement data, from first information of a plurality of products stored in a storage device.

19 Claims, 20 Drawing Sheets

(56) References Cited

FOREIGN PATENT DOCUMENTS

JP    2018-180803 A    11/2018
JP    2019-061430 A    4/2019

OTHER PUBLICATIONS

English translation of Written Opinion dated Jun. 23, 2020 issued by the International Searching Authority in International Application No. PCT/JP2020/015891.
International Search Report for PCT/JP2020/015891 dated Jun. 23, 2020 [PCT/ISA/210].
Written Opinion for PCT/JP2020/015891 dated Jun. 23, 2020 [PCT/ISA/237].

* cited by examiner

FIG. 3

| Height | Width | Depth | Search word |
|--------|-------|-------|-------------|
| 60cm   | 50cm  | 40cm  | Furniture   |

FIG. 8

| Height | Width | Depth | Orientation of product | Search word |
|---|---|---|---|---|
| 60cm | 50cm | 40cm | Horizontal | Furniture |

INFORMATION PROCESSING METHOD, PROGRAM, AND TERMINAL

CROSS-REFERENCE TO RELATED APPLICATIONS

This application is a by-pass continuation application of International Application No. PCT/JP2020/015891, filed on Apr. 8, 2020, which claims priority from Japanese Patent Application No. 2019-122147, filed on Jun. 28, 2019, in the Japanese Patent Office, the disclosures of which are incorporated by reference herein in their entireties.

BACKGROUND

1. Technical Field

The present disclosure relates to an information processing method, a program, and a terminal.

2. Description of Related Art

In recent years, various methods of purchasing products, such as Internet shopping, have been provided. Related art product purchasing systems may employ techniques for potentially reducing erroneous determination in matching provided products with ordered products. However, there exists a need for further improvements. Improvements are presented herein.

SUMMARY

According to an aspect of the disclosure, there is provided an information processing method of a terminal, the information processing method including acquiring measurement data obtained by measuring a product area contained in a captured image; and notifying, a user of the terminal, of second information of at least one first product that is selected, based on the measurement data, from first information of a plurality of products stored in a storage device.

According to an aspect of the disclosure, there is provided a non-transitory computer-readable storage medium storing a program that, when executed by at least one processor of a terminal, causes the terminal to: acquire measurement data obtained by measuring an area contained in a captured image; and notify, a user of the terminal, of second information of at least one product that is selected, based on the measurement data, from first information of a plurality of products stored in a storage device.

According to an aspect of the disclosure, there is provided a terminal for processing information, the terminal including: an acquiring device configured to acquire measurement data obtained by measuring an area contained in a captured image; and a notifying device configured to notify, a user of the terminal, of second information of at least one product that is selected, based on the measurement data, from first information of a plurality of products stored in a storage device.

According to an aspect of the disclosure, there is provided a terminal for processing information, the terminal comprising: a memory storing a program; and a processor configured to execute the program to: acquire measurement data obtained by measuring an area contained in a captured image; and notify, a user of the terminal, of second information of at least one product that is selected, based on the measurement data, from first information of a plurality of products stored in a storage device.

BRIEF DESCRIPTION OF THE DRAWINGS

FIG. 3 is a diagram showing an example of search information according to the first embodiment.

FIG. 8 is a diagram showing an example of search information according to a third embodiment.

DETAILED DESCRIPTION

Figure 1:
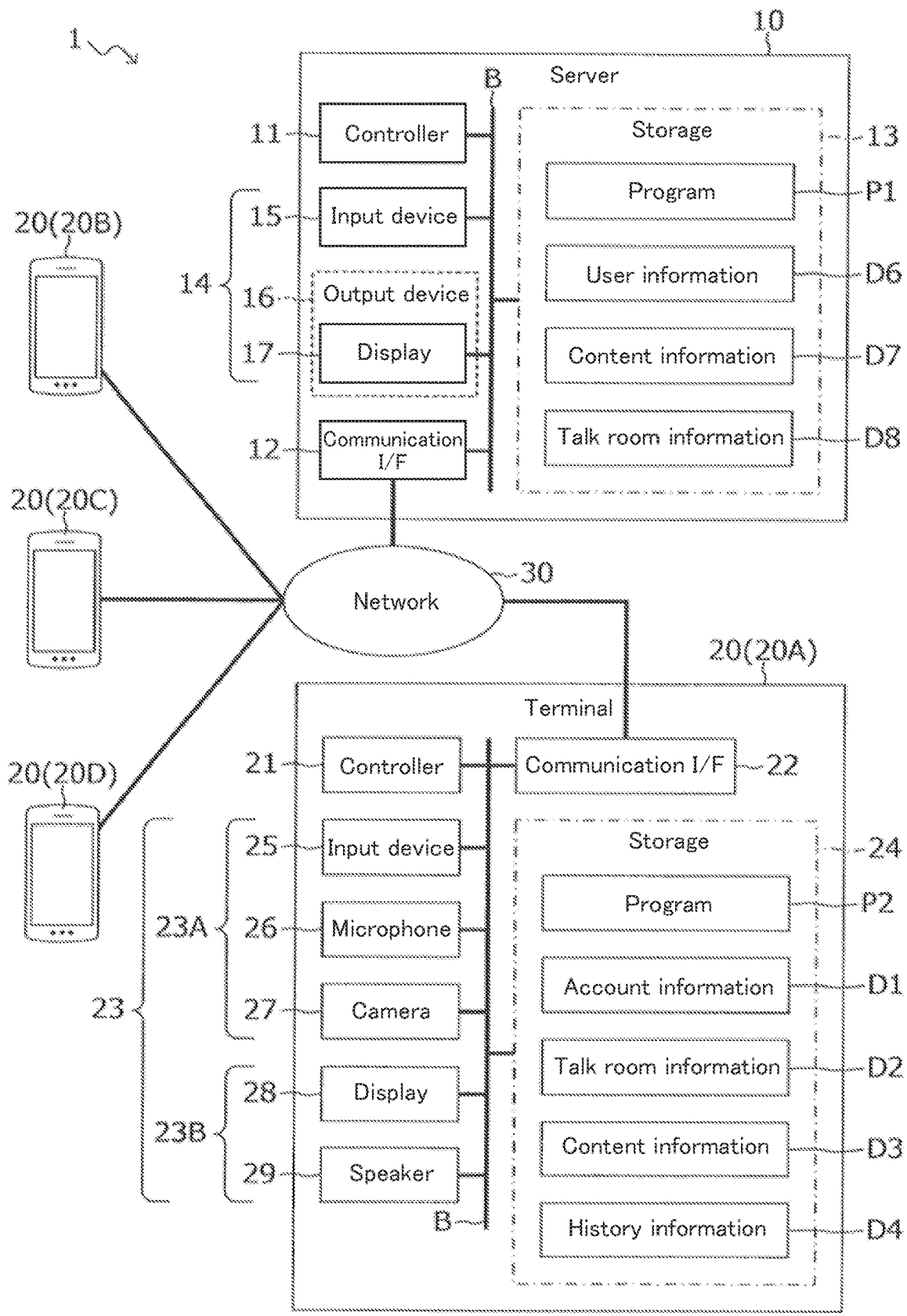
FIG. 1 is a diagram showing an example of a configuration of a communication system in an aspect of an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments may be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

FIG. 1 is a diagram showing an example of a configuration of a communication system 1 according to an embodiment of the present disclosure. As shown in FIG. 1, in the communication system 1, a server 10 and terminals 20 (e.g., terminals 20A, 20B, 20C, and 20D) are connected (e.g., communicatively coupled) to each other via a network 30. The server 10 provides, via the network 30 to the terminals 20 used by respective users, a service for enabling the terminals 20 to transmit and receive messages and the like. Note that there is no limitation on the number of terminals 20 connected to the network 30.

The network 30 serves to connect one or more terminals 20 and one or more servers 10 to each other. That is, the network 30 serves as a communication network that provides a connection path to enable the various types of devices described above to transmit and receive data after a terminal 20 is connected to a server 10.

One or more portions of the network 30 may be a wired network and/or a wireless network. Non-limiting examples of the network 30 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a mobile phone network, integrated service digital networks (ISDNs), a radio LAN, long term evolution (LTE), code division multiple access (CDMA), Bluetooth™, satellite communication, and a combination of two or more of these networks. The network 30 may be constituted by a single network 30 or a plurality of networks 30.

The terminals 20 may be any information processing terminal capable of implementing functions described in embodiments of the present disclosure. Non-limiting examples of the terminals 20 include a smartphone, a mobile phone (e.g., a feature phone), a computer (non-limiting examples of which include a desktop, a laptop, and a tablet), a media computer platform (non-limiting examples of which include cable and satellite set-top boxes and a digital video recorder), a handheld computer device (non-limiting examples of which include a personal digital assistant (PDA) and an electronic mail client), a wearable terminal (non-limiting examples of which may include an eyeglasses-type device, a watch-type device, etc.), and other types of computers and communication platforms. In some embodiments, the terminals 20 may be referred to as "information processing terminals".

In some embodiments, configurations of the terminals 20A, 20B, 20C, and 20D may substantially be the same as each other. Alternatively or additionally, a terminal that is used by a user X will be referred to as a "terminal 20X", and user information that is associated with the user X and/or the terminal 20X in a predetermined service will be referred to as "user information X", as necessary. The user information is information regarding a user associated with an account that is employed by the user in the predetermined service. Non-limiting examples of the user information include information that is input by the user and/or is assigned by the predetermined service, and is associated with the user, such as a name of the user, an icon image of the user, an age of the user, a gender of the user, an address of the user, hobbies/preferences of the user, and a user identifier. Alternatively or additionally, the user information may be any one of or a combination of two or more of these pieces of information.

The server 10 is configured to provide a predetermined service to the terminal 20. The server 10 may be any information processing device capable of implementing functions described in embodiments of the present disclosure. Non-limiting examples of the server 10 include a server device, a computer (non-limiting examples of which include a desktop, a laptop, and a tablet), a media computer platform (non-limiting examples of which include cable and satellite set-top boxes and a digital video recorder), a handheld computer device (non-limiting examples of which include a PDA and an electronic mail client), and other types of computers and communication platforms. In some embodiments, the server 10 may be referred to as an "information processing device". If there is no need to distinguish the server 10 and the terminal 20, either one or both of the server 10 and the terminal 20 may be referred to as an "information processing device".

Hardware (HW) Configurations

HW configurations of the devices included in the communication system 1 will be described with reference to FIG. 1.

(1) HW Configuration of Terminal

The terminal 20 includes a controller 21 (e.g., a central processing unit (CPU) or processor), a storage 24, a communication interface (I/F) 22, and an input/output (I/O) device 23. The input/output device 23 includes an input device 23A and an output device 23B. The input device 23A includes an input device 25, a microphone 26, and a camera 27. The output device 23B includes a display 28 and a speaker 29. The HW constituent elements of the terminal 20 are connected (e.g., communicatively coupled) to each other via a bus B, for example, without limitation thereto. In some embodiments, a the HW configuration of the terminal 20 may not include all of the constituent elements shown in FIG. 1. For example, the terminal 20 may be configured such that one or more constituent elements, such as the microphone 26 and/or the camera 27, are removable.

The communication IF 22 transmits and/or receives various types of data via the network 30. The communication may be carried out in a wired and/or a wireless manner, and may be based on any communication protocol that enables mutual communication to be carried out. The communication IF 22 may communicate with the server 10 via the network 30. The communication IF 22 transmits various types of data to the server 10 in accordance with instructions from the controller 21. Alternatively or additionally, the communication I/F 22 receives various types of data transmitted from the server 10, and conveys the received data to the controller 21. In some embodiments, the communication I/F 22 may be referred to as a "communication interface". Alternatively or additionally, the communication I/F 22 may be referred to as a "communication circuit" in cases where the communication IF 22 is constituted by a physically structured circuit.

The input/output device 23 includes a device that inputs various operations made to the terminal 20 and/or a device that outputs a result of processing performed by the terminal 20. Alternatively or additionally, the input/output device 23 may be constituted by the input device 23A and/or the output device 23B that may be configured as a single device and/or as multiple devices separate from each other, but there is no limitation thereto.

The input device 23A is implemented by any one of or a combination of two or more types of devices capable of accepting input from a user and conveying information regarding the input to the controller 21. Non-limiting examples of the input device 23A include a touch panel, a touch display, hardware keys of a keyboard or the like, a pointing device such as a mouse, a camera (e.g., input of operations via moving images), and a microphone (e.g., input of operations using voice).

The output device 23B is implemented by any one of or a combination of two or more types of devices capable of outputting a result of processing performed by the controller 21. Non-limiting examples of the output device 23B include a touch panel, a touch display, a speaker (e.g., audio output), a lens configured to produce image output (non-limiting examples of which include three-dimensional (3D) image output and hologram image output), and a printer.

The display 28 is implemented by any one of or a combination of two or more types of devices capable of providing display in accordance with display data written in a frame buffer. Non-limiting examples of the display 28 include a touch panel, a touch display, a monitor (non-limiting examples of which include a liquid crystal display and an organic electroluminescence display (OELD)), a head mounted display (HDM), and devices capable of displaying images, text information, and the like using projection mapping or holograms, or in the air (and/or a vacuum). Alternatively or additionally, the display 28 may be capable of displaying display data in 3D.

In some embodiments, if the input/output device 23 is a touch panel, the input device 25 and the display 28 may have substantially the same size and shape and be arranged opposing each other.

The controller 21 includes a physically structured circuit for executing functions that are implemented in accordance with codes or commands included in a program, and is implemented by a data processing device embedded in hardware, for example, without limitation thereto. Accordingly, in some embodiments, the controller 21 may be referred to as a "control circuit".

Non-limiting examples of the controller 21 include a CPU, a microprocessor, a processor core, a multiprocessor, an Application-Specific Integrated Circuit (ASIC), and a Field Programmable Gate Array (FPGA).

The storage 24 may store various programs and various types of data that are necessary for the terminal 20 to operate. Non-limiting examples of the storage 24 include various storage media such as a Hard Disk Drive (HDD), a Solid State Drive (SSD), a flash memory, a Random Access Memory (RAM), and a Read Only Memory (ROM). In some embodiments, the storage 24 may be referred to as a "memory".

The terminal 20 stores a program P2 in the storage 24, and the controller 21 executes the program P2 to perform operations according to the program P while serving as units that are included in the controller 21. That is, the program P2 stored in the storage 24 causes the terminal 20 to implement functions executed by the controller 21. In some embodiments, the program P2 may be referred to as a "program module" or as "computer-readable instructions".

The microphone 26 is used to input audio data. The speaker 29 is used to output audio data. The camera 27 is used to acquire moving image data.

The storage 24 of the terminal 20 stores information used in a messaging service, for example, without limitation thereto. Non-limiting examples of the information include account information D1, talk room information D2, content information D3, and history information D4.

The account information D1 is information on an account that is used by a user of the terminal 20 in a messaging service. The talk room information D2 contains information regarding a talk room in a messaging service, for example, without limitation thereto. The content information D3 contains an image that is to be displayed in a talk room, and/or an image that is to be displayed for searching for a product, for example, without limitation thereto. The history information D4 is information regarding a history of content that was transmitted and/or received, for example, without limitation thereto.

(2) HW Configuration of Server

The server 10 includes a controller 11 (e.g., CPU), a storage 13, a communication IF 12, and an I/O device 14 (e.g., an I/O I/F). The input/output I/O device 14 serves as an input device 15 and an output device 16. The output device 16 includes a display 17. The HW constituent elements of the server 10 are connected (e.g., communicatively coupled) to each other via a bus B, for example, without limitation thereto. In some embodiments, the HW configuration of the server 10 may not include all of the constituent elements. For example, HW of the server 10 may be configured such that the display 17 (non-limiting examples of which include a display screen) is removable.

The controller 11 includes a physically structured circuit for executing functions that are implemented in accordance with codes and/or commands included in a program, and is implemented by a data processing device embedded in hardware, for example, without limitation thereto.

The controller 11 may include a CPU, and may be implemented as a microprocessor, a processor core, a multiprocessor, an ASIC, or an FPGA. In the present disclosure, the controller 11 is not limited to these examples.

The storage 13 may store various programs and various types of data that are necessary for the server 10 to operate. The storage 13 is implemented by various storage media such as an HDD, an SSD, and a flash memory. However, in the present disclosure, the storage 13 is not limited to these examples. In some embodiments, the storage 13 may be referred to as a "memory".

The communication I/F 12 transmits and/or receives various types of data via the network 30. The communication may be carried out in a wired or wireless manner, and may be based on any communication protocol that enables mutual communication to be carried out. The communication I/F 12 may communicate with the terminal 20 via the network 30. The communication I/F 12 transmits various types of data to the terminal 20 in accordance with instructions from the controller 11. Alternatively or additionally, the communication I/F 12 receives various types of data transmitted from the terminal 20 and conveys the data to the controller 11. The communication IF 12 may be referred to as a "communication interface". Alternatively or additionally, the communication I/F 12 may be referred to as a "communication circuit" in cases where the communication I/F 12 is constituted by a physically structured circuit.

The input device 15 is implemented by a device that inputs various operations that are made to the server 10. The input device 15 is implemented by any one of or a combination of two or more of all types of devices capable of accepting input from a user and conveying information regarding the input to the controller 11. The input device 15 is implemented by hardware keys, a typical example of which is a keyboard, and a pointing device such as a mouse. In some embodiments, the input device 15 may include a touch panel, a camera (input of operations via moving images), or a microphone (input of operations using voice). However, in the present disclosure, the input device 15 is not limited to these examples.

The display 17 may be implemented as a display monitor (non-limiting examples of which may include a liquid crystal display, an organic electroluminescence display (OELD), a head mounted display (HDM) or the like. In other embodiments, the display 17 may be capable of displaying display data in 3D. In the present disclosure, the display 17 is not limited to these examples.

The server 10 stores the program P1 in the storage 13, and the controller 11 executes the program P1 to execute processing while serving as units that are included in the controller 11. That is, the program P1 stored in the storage 13 causes the server 10 to implement functions executed by the controller 11. In some embodiments, the program P1 may be referred to as a "program module" and/or as "computer-readable instruction".

The storage 13 of the server 10 stores information used in a messaging service, for example, without limitation thereto. Non-limiting examples of the information include user information D6, content information D7, and talk room information D8.

The user information D6 contains a user ID and a password associated with each account in a messaging service, for example, without limitation thereto. The content information D7 contains information on content transmitted by each terminal 20 of a plurality of terminals 20, for example, without limitation thereto. The talk room information D8 contains information regarding a talk room in a messaging service, for example, without limitation thereto.

Some embodiments of the present disclosure will be described as being implemented as a result of CPU(s) of the terminal 20 and/or the server 10 executing the program P.

In some embodiments, the controller 21 of the terminal 20 and/or the controller 11 of the server 10 may perform operations using the CPU(s) including a control circuit, and/or a logic circuit (hardware) or a dedicated circuit that is formed on an integrated circuit (e.g., an Integrated Circuit (IC) chip or a Large Scale Integration (LSI) chip) or the like). Alternatively or additionally, these circuits may be implemented by one or more integrated circuits, and a plurality of types of processing described in the embodiments may be implemented by a single integrated circuit. LSI may be referred to as VLSI, super LSI, ultra LSI, or the like depending on the degree of integration. Accordingly, the controller 21 may be referred to as a "control circuit".

The programs P1 and P2 (non-limiting examples of which include a software program, a computer program, and a program module) in the embodiments of the present disclosure may be provided in a state where the program is stored in a computer-readable storage medium. The programs P1 and P2 may be stored in a "non-transitory tangible medium". Alternatively or additionally, the programs P1 and P2 may be a program for implementing some of the functions described in the embodiments of the present disclosure. Furthermore, the programs P1 and P2 may be a differential file (e.g., a differential program) that is configured to implement the functions described in the embodiments of the present disclosure in combination with a program P1 or P2 that is already recorded in a storage medium.

The storage medium may include one or more semiconductor-based or other integrated circuits (ICs), non-limiting examples of which include FPGAs and ASICs), HDDs, hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM drives, secure digital cards, drives, any other appropriate storage media, and a suitable combination of two or more of these storage media. Where appropriate, the storage medium may consist only of a volatile storage medium or a non-volatile storage medium, or a combination of volatile and non-volatile storage media. Note that the storage medium is not limited to these examples, and may be any device or medium that is capable of storing the program P. Alternatively or additionally, the storage medium may be referred to as a "memory".

The server 10 and/or the terminal 20 may implement functions of a plurality of functional units described in the embodiments by reading the program P stored in the storage medium and executing the read program P.

The programs P1 and P2 according to the present disclosure may be provided to the server 10 and/or the terminal 20 via any transmission medium (a communication network, broadcast waves, etc.) that is capable of transmitting the programs P1 and P2. The server 10 and/or the terminal 20 implement(s) the functions of the functional units described in the embodiments by executing the programs P1 and P2 downloaded via the Internet or the like, for example, without limitation thereto.

The embodiments of the present disclosure may be implemented in the form of a data signal in which the programs P1 and P2 are embodied through electronic transmission or embedded in carrier waves.

In some embodiments, at least a portion of processing in the server 10 and/or the terminal 20 may be implemented through cloud computing constituted by one or more computers.

In some embodiments, at least a portion of processing in the terminal 20 may be carried out by the server 10. For example, the server 10 may carry out at least a portion of processing carried out by functional units of the controller 21 of the terminal 20.

In some embodiments, at least a portion of processing in the server 10 may optionally be carried out by the terminal 20 For example, the terminal 20 may carry out at least a portion of processing carried out by functional units of the controller 11 of the server 10.

In the embodiments of the present disclosure, configurations for determination are not essential unless explicitly mentioned otherwise, and predetermined processing may be activated in case a determination condition is satisfied, or predetermined processing may be activated in case a determination condition is not satisfied, without limitation thereto.

The program according to the present disclosure is implemented using a script language such as ActionScript or JavaScript™, an object-oriented programming language such as Objective-C or Java™, or a markup language such as HyperText Markup Language 5 (HTML5), for example, although there is no limitation thereto.

First Embodiment

A first embodiment is an embodiment in which the terminal 20 notifies a user of the terminal 20 of information on at least one product, from information regarding a plurality of products stored in the storage 13 of the server 10, based on measurement data obtained by measuring an area contained in a captured image.

The content described in the first embodiment may be applied to any of the second to eighth embodiments described below.

Figure 2:
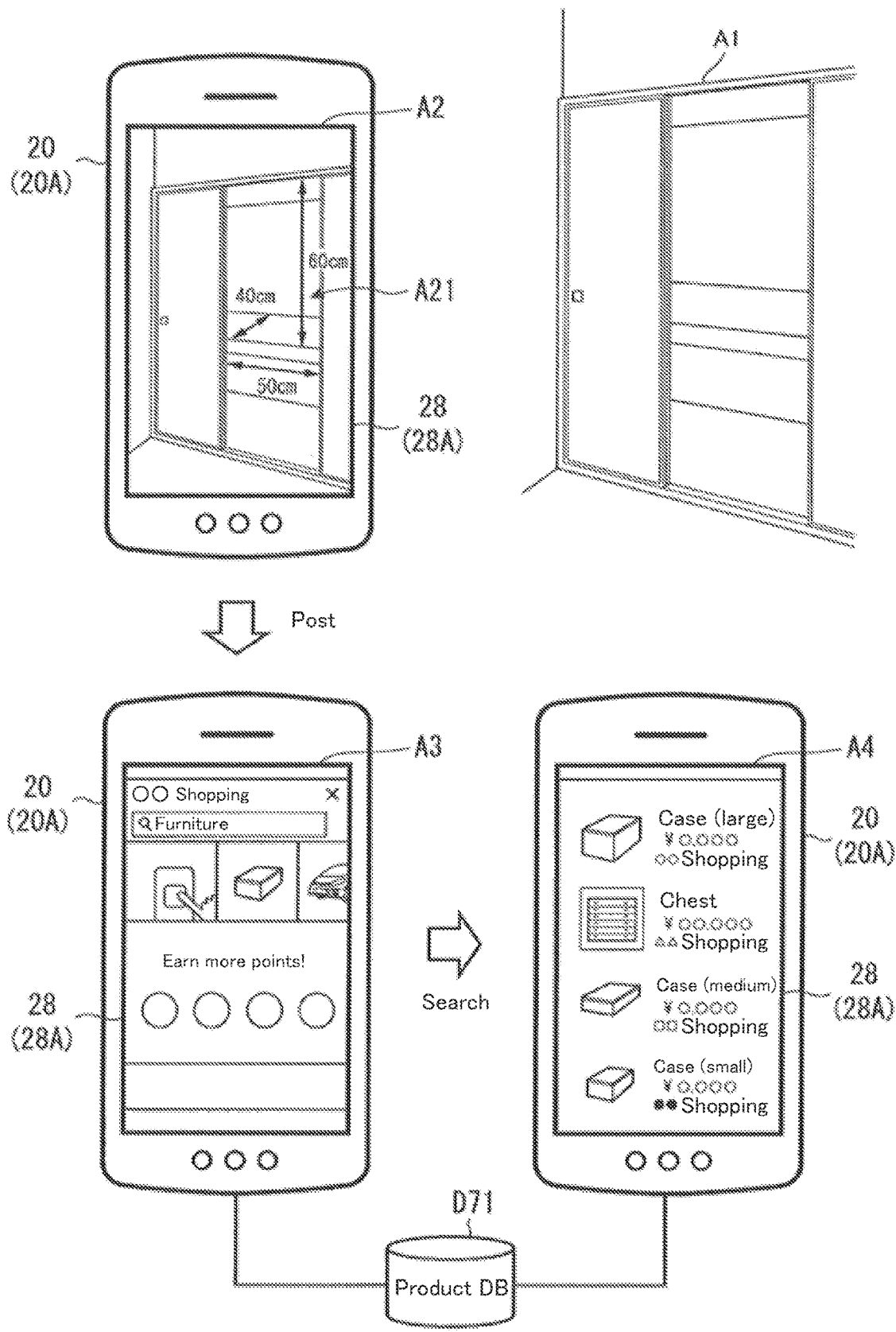
FIG. 2 is a diagram showing an example of information processing according to a first embodiment.

FIG. 2 is a diagram showing an example of information processing according to the first embodiment.

Referring FIG. 2, a closet A1 is shown as a location whose image is to be captured by the terminal 20 (e.g., the terminal 20A shown in FIG. 1).

As indicated by the reference numeral A2, the display 28 of the terminal 20 (e.g., the display 28A of the terminal 20A shown in FIG. 1) may acquire and/or display the captured image. The captured image may be captured by the camera 27 of the terminal 20, for example, without limitation thereto. Alternatively or additionally, the captured image may be captured by another device (not shown) and acquired by the terminal 20 from the another device, for example, without limitation thereto.

Referring to FIG. 2, as indicated by the reference numeral A21, the display 28 of the terminal 20 may acquire measurement data obtained by measuring an area contained in the captured image. The measurement data may indicate the size of an area in which the user of the terminal 20 wants to place a product. For example, as shown in FIG. 2, the area may have a height of 60 cm, a width of 50 cm, and/or a depth of 40 cm. In the description below, the measurement data may be acquired by an application for searching for a product, for example, without limitation thereto. Alternatively or additionally, the size of an area contained in the measurement data is not limited to the case where the size of the area is indicated by three sides, but may be indicated by two sides or less, or by four sides or more. The measurement data may be calculated from the captured image by the controller 21 of the terminal 20, for example, without limitation thereto. In other embodiments, the measurement data may be calculated from the captured image by another device (not shown) and acquired by the terminal 20 from the another device, for example, without limitation thereto.

That is, the terminal 20 acquires measurement data obtained by measuring an area contained in the captured image. Alternatively or additionally, the captured image is captured by an imaging device (e.g., the camera 27 shown in FIG. 1) of the terminal 20, for example, without limitation thereto.

The captured image may be displayed in a display area of the terminal 20, for example, without limitation thereto. Furthermore, information based on the measurement data may be displayed in the display area so as to be superimposed on the area contained in the captured image displayed on the display area, for example, without limitation thereto.

Referring to FIG. 2, as indicated by the reference numeral A3, when the measurement data acquired by the terminal 20 is posted to the server 10, the display 28 of the terminal 20 displays a screen of a shopping site provided by the server 10. For example shown in FIG. 2, "furniture" is posted as a search word for a product that the user wants to purchase, in addition to the measurement data. The search word may input through the input device 25 and/or the microphone 26 of the terminal 20 shown in FIG. 1. The measurement data and the search word may be collectively referred to as search information, for example, without limitation thereto.

Referring to FIG. 2, as indicated by the reference numeral A4, a product database (DB) D71 contained in the content information D7 in the server 10 is searched for a list of products that match the search information, and the list of products is displayed on the display 28 of the terminal 20.

That is, the terminal 20 notifies the user of the terminal 20 of information on at least a first product selected based on the measurement data, out of information regarding a plurality of products stored in the storage device (e.g., the storage 13 shown in FIG. 1). The first product may be a product with a size included inside the area, for example, without limitation thereto. For example shown in FIG. 2, the first product is of a size that is included inside the area whose measured size is as indicated by the reference numeral A21. That is, the first product may have a height of 60 cm or less, a width of 50 cm or less and a depth of 40 cm or less.

FIG. 3 is a diagram showing an example of search information according to the first embodiment.

In some embodiments, the search information may comprise measurement data. In some embodiments, the search information is transmitted from the terminal 20 to the server 10, and the search is performed for a product with a size included inside an area in which the user is going to place the product. In the example shown in FIG. 3, a height of 60 cm, a width of 50 cm, and a depth of 40 cm are registered as the measurement data.

Alternatively or additionally, the search information may contain a search word in addition to the measurement data, for example, without limitation thereto. If the search information contains a search word, the search is performed for a product that has a size less than or equal to the size indicated by the measurement data, and that contains the search word in the name or description of the product or that has a name matching the search word. For example, as shown in FIG. 3, "furniture" is registered as a search word.

Functional Configuration (1) Functional Configuration of Terminal

Figure 4:
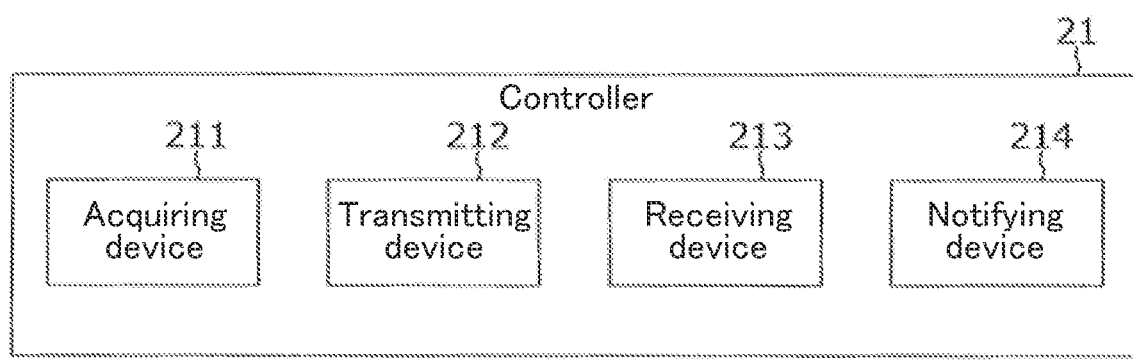
FIG. 4 is a diagram showing an example of a functional configuration of a terminal according to the first embodiment.

FIG. 4 is a diagram showing an example of the functional configuration of a terminal according to the first embodiment.

As shown in FIG. 4, the terminal 20 has an acquiring device 211 (non-limiting examples of which include an acquiring circuit), a transmitting device 212 (non-limiting examples of which include a transmitting circuit), a receiving device 213 (non-limiting examples of which include a receiving circuit), and a notifying device 214 (non-limiting examples of which include a notifying circuit), as functions realized by the controller 21 shown in FIG. 1. The acquiring device 211 may be configured to acquire measurement data obtained by measuring an area contained in a captured image. The transmitting device 212 may be configured to transmit search information containing at least the measurement data to the server 10. The receiving device 213 may be configured to receive information on a product that satisfies a search condition from the server 10. The notifying device 214 may be configured to notify the user of the terminal 20 of information on at least one product selected based on a search condition (non-limiting examples of which include measurement data) out of information regarding a plurality of products stored in the product database D71.

(2) Functional Configuration of Server

Figure 5:
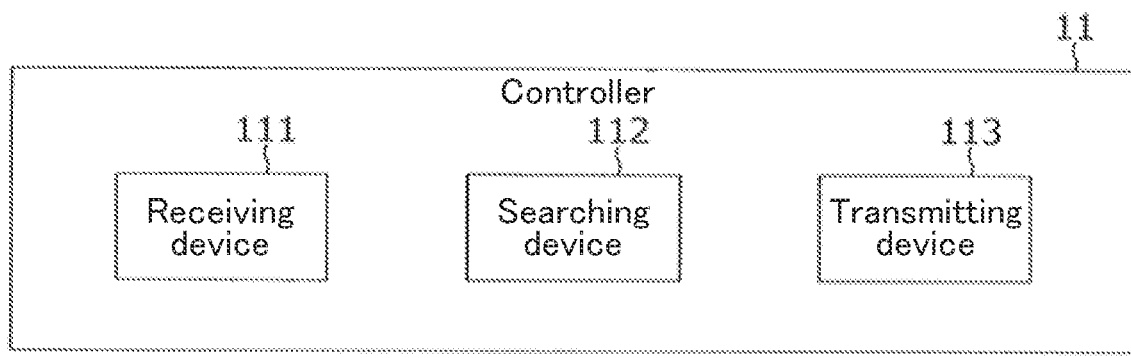
FIG. 5 is a diagram showing an example of a functional configuration of a server according to the first embodiment.

FIG. 5 is a diagram showing an example of the functional configuration of the server 10 according to the first embodiment.

As shown in FIG. 5, the server 10 has a receiving device 111 (non-limiting examples of which include a receiving circuit), a searching device 112 (non-limiting examples of which include a searching circuit), and a transmitting device 113 (non-limiting examples of which include a transmitting circuit), as functions realized by the controller 11 shown in FIG. 1. The receiving device 111 may be configured to receive search information containing at least measurement data from the terminal 20. The searching device 112 may be configured to search the product database D71 for a product included inside an area contained in a captured image, based on the search information. The transmitting device 113 may be configured to transmit information on a found product to the terminal 20.

Information Processing

Figure 6:
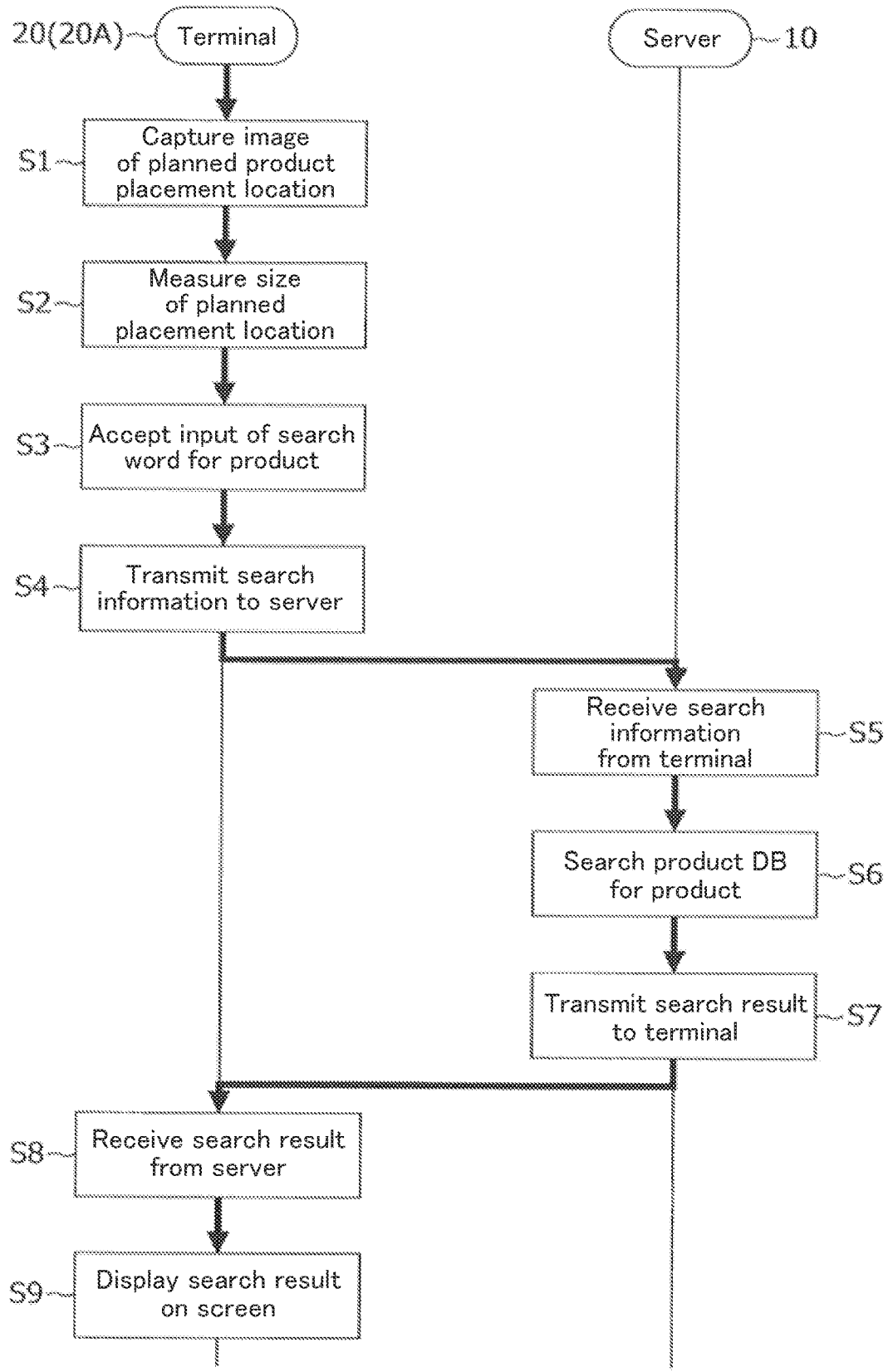
FIG. 6 is a diagram showing an example of a sequence of information processing according to the first embodiment.

The sequence of the information processing according to the first embodiment will be described based on the configuration of the communication system 1 with reference to FIG. 6. FIG. 6 is a diagram showing an example of a sequence of the information processing according to the first embodiment.

In step S1, the terminal 20 (e.g., the terminal 20A shown in FIG. 1) captures an image of a planned product placement location, using the camera 27, for example. If an image of a planned product placement location is captured by another device (not shown), the processing in step S1 is replaced by processing in which the terminal 20 acquires the captured image from the other device.

In step S2, the terminal 20 measures the size of an area in the planned placement location, thereby generating measurement data. If the size of an area is measured by another device (e.g., the server 10 or another device), the processing in step S1 is omitted, and the processing in step S2 is replaced by processing in which the terminal 20 acquires the measurement data from the server or the another device.

In step S3, the terminal 20 accepts input of a search word for a product, using the input device 25 or the microphone 26, for example.

In step S4, the terminal 20 generates search information in which the measurement data is associated with the search word, and transmits, via the communication I/F 22, the generated search information to the server 10.

In step S5, the server 10 receives, via the communication I/F 12, the search information from the terminal 20.

In step S6, the server 10 searches the product database D71 for a product, based on the received search information.

In step S7, the server 10 transmits, via the communication I/F 12, information on a product contained in the search result to the terminal 20.

In step S8, the terminal 20 receives, via the communication I/F 22, the information on the product contained in the search result from the server 10.

In step S9, the terminal 20 displays the information on the product contained in the search result, on the screen of the display 28.

Effects of First Embodiment

According to the first embodiment, a product with an appropriate size for a planned placement location may be searched. That is, when purchasing a product, such as furniture or electrical appliances through Internet shopping, a case in which the purchased product does not fit in the planned placement location may be prevented. Alternatively or additionally, a product with a size included inside an area in a planned product placement location may be searched. Moreover, a product that fits in a planned placement location may be searched for in an efficient manner, and thus, the number of times the terminal 20 is operated and the number of times the terminal 20 communicates with the server 10 may be reduced, possibly reducing the load (e.g., processing, network) on the terminal 20 and the server 10.

First Modified Example

According to the first embodiment described above, measurement data is acquired by an application (e.g., a search application) for searching for a product. Alternatively or additionally, according to a first modified example, measurement data is acquired using a measurement application installed in the operating system (OS) of the terminal 20. The search application may be linked to the measurement application, and the search application may acquire the measurement data obtained through measurement by the measurement application, for example, without limitation thereto.

Since the measurement data is acquired by the measurement application, the program of the search application may be simplified.

Second Modified Example

According to the first embodiment described above, the server 10 searches for a product that is a ready-made product. Alternatively or additionally, according to a second modified example, the server 10 may search for a custom-made product that satisfies the search information, for example, without limitation thereto. For example, the server 10 searches for products that may be ordered so that the size is included inside the area of the captured image, out of semi-custom furniture and curtains that are manufactured in a predetermined range of sizes.

Advantageously, the number of searchable products may be increased by implementing a search for custom-made products.

Second Embodiment

According to the first embodiment described above, the product database D71 is provided in the server 10. Alternatively or additionally, according to a second embodiment, the product database D71 is provided in a shopping server different from the server 10.

Figure 7:
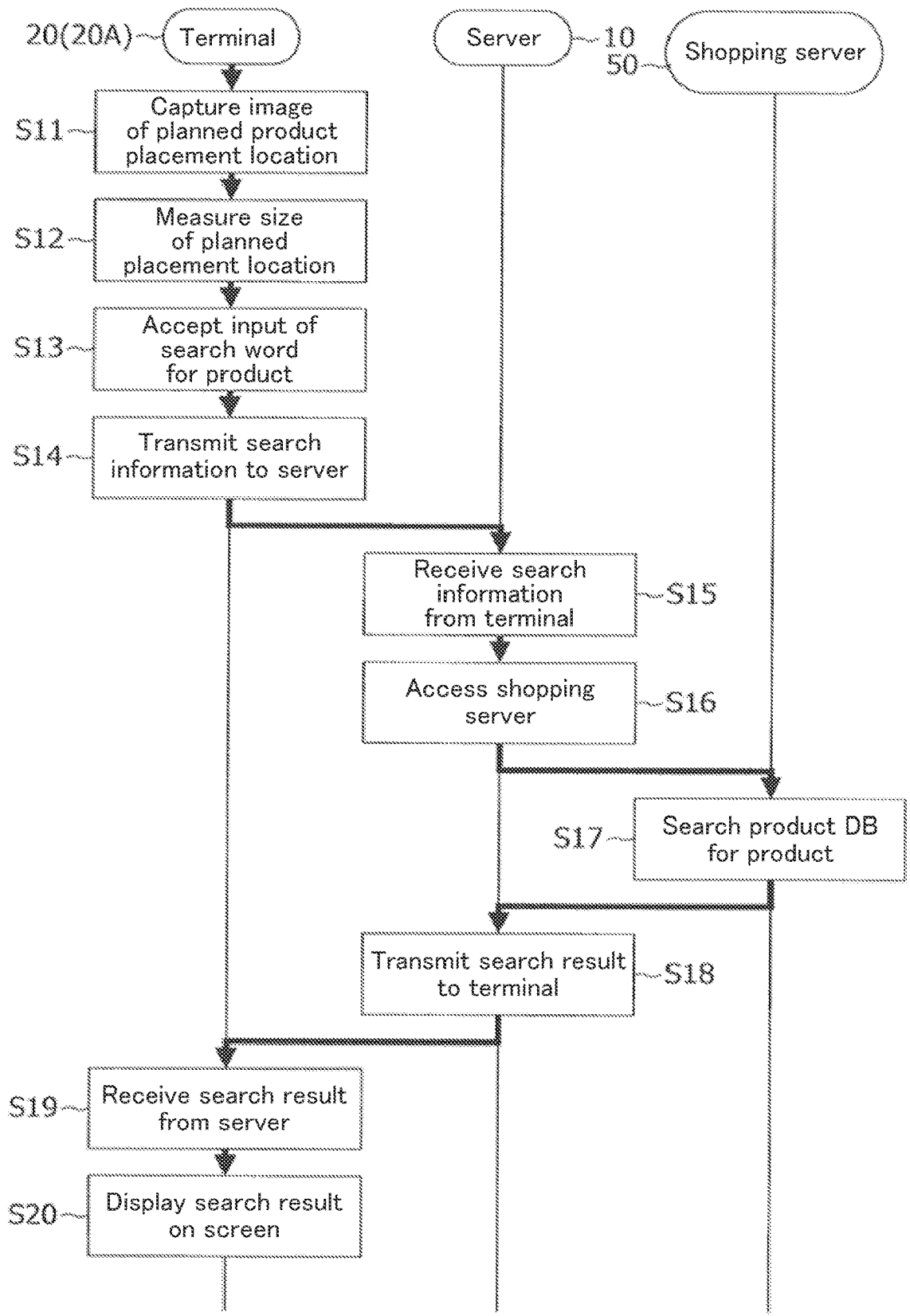
FIG. 7 is a diagram showing an example of a sequence of information processing according to a second embodiment.

FIG. 7 is a diagram showing an example of a sequence of the information processing according to the second embodiment. Hereinafter, the sequence of the information processing according to the second embodiment will be described with reference to FIG. 7.

A shopping server 50 is provided separately from the server 10 shown in FIG. 1, and is configured to communicate with the server 10 and the terminal 20 by being connected (e.g., communicatively coupled) to the network 30. Alternatively or additionally, the shopping server 50 may have a substantially similar HW configuration as the server 10, for example, without limitation thereto.

In step S11, the terminal 20 (e.g., the terminal 20A shown in FIG. 1) captures an image of a planned product placement location, using the camera 27, for example. If an image of a planned product placement location is captured by another device (not shown), the processing in step S11 is replaced by processing in which the terminal 20 acquires the captured image from the other device. For example, an image captured by a camera different from that of the terminal 20 is transferred to the terminal 20.

In step S12, the terminal 20 measures the size of an area in the planned placement location, thereby generating measurement data. If the size of an area is measured by another device (not shown), the processing in step S11 is omitted, and the processing in step S12 is replaced by processing in which the terminal 20 acquires the measurement data from the another device.

In step S13, the terminal 20 accepts input of a search word for a product, using the input device 25 or the microphone 26, for example.

In step S14, the terminal 20 generates search information in which the measurement data is associated with the search word, and transmits, via the communication I/F 22, the generated search information to the server 10.

In step S15, the server 10 receives, via the communication I/F 12, the search information from the terminal 20.

In step S16, the server 10 accesses the shopping server 50 via the communication I/F 22, and converts the search information received from the terminal 20 into a format acceptable to the shopping server 50 and transfers the information.

In step S17, the shopping server 50 searches the product database D71 for a product, in response to the access from the server 10.

In step S18, the server 10 transfers, via the communication I/F 12, information on a product contained in the search result acquired from the shopping server 50, to the terminal 20.

In step S19, the terminal 20 receives, via the communication I/F 22, the information on the product contained in the search result from the server 10.

In step S20, the terminal 20 displays the information on the product contained in the search result, on the screen of the display 28.

That is, the storage device (e.g., the storage corresponding to the storage 13 shown in FIG. 1) having the product database D71 may be the first server (the shopping server 50 shown in FIG. 7), for example, without limitation thereto. Alternatively or additionally, an image may be transmitted via the communication interface (e.g., the communication I/F 22 shown in FIG. 1) of the terminal 20 to the second server (e.g., the server 10 shown in FIG. 7), for example, without limitation thereto. Alternatively or additionally, the measurement data obtained through measurement by the second server may be received from the second server via the communication interface, for example, without limitation thereto.

Effects of Second Embodiment

The second embodiment described above may achieve the following effects in addition to the effects achieved in the foregoing embodiment.

That is, a product with a size included inside an area in a planned product placement location may be searched. For example, in the case in which a shopping site service is provided through the shopping server 50 by a service provider different from that of the server 10 that acquires measurement data from the terminal 20 of the user.

Third Embodiment

According to the first embodiment described above, a product is suggested through specification of measurement data of the height, the width, and the depth of an area in a planned product placement location, and a search word, in the search information shown in FIG. 3. Alternatively or additionally, according to a third embodiment, a product is suggested through specification of the orientation of the placement of the product in a planned product placement location, in addition to the measurement data and the search data, in the search information.

FIG. 8 is a diagram showing an example of search information according to the third embodiment.

The search information shown in FIG. 8 contains information indicating the orientation of a product, in addition to measurement data of the height, the width, and the depth, and a search word. For example, as shown in FIG. 8, "horizontal" is registered as the orientation of a product, and the height and the width of the measurement data are switched to search the product database D71 for a product.

Alternatively or additionally, "unspecified" may be registered as the orientation of a product, for example, without limitation thereto. If "unspecified" is registered as the orientation of a product, the height, the width, and the depth of the measurement data are switched as appropriate to search the product database D71 for a product.

That is, information regarding the placement orientation of a product that is to be placed in the area may be obtained by the terminal 20, for example, without limitation thereto. Alternatively or additionally, the terminal 20 may notify the user of the terminal 20 of information on at least a first product selected based on the measurement data and information regarding the placement orientation of a product that is to be placed in the area, from information regarding a plurality of products stored in the storage device (e.g., the storage 13 shown in FIG. 1) having the product database D71, for example, without limitation thereto.

Effects of Third Embodiment

The third embodiment described above may achieve the following effects in addition to the effects achieved in the foregoing embodiments.

For example, when placing a shelf without a drawer or a lid, a determination may be made as to whether the product may be placed in any orientation selected by a user, without limitation of the height, the width, and the depth of products registered in the product database D71.

Fourth Embodiment

According to the first embodiment described above, as shown in FIG. 2, a list of products that satisfy search information is displayed on the display 28 of the terminal 20. Alternatively or additionally, according to a fourth embodiment, an image of an image of a product selected by a user out of a list of products is superimposed through an augmented reality (AR) technique, for example, on a captured image of a planned placement location, and thus, the obtained image is displayed on the display 28 of the terminal 20.

Figure 9:
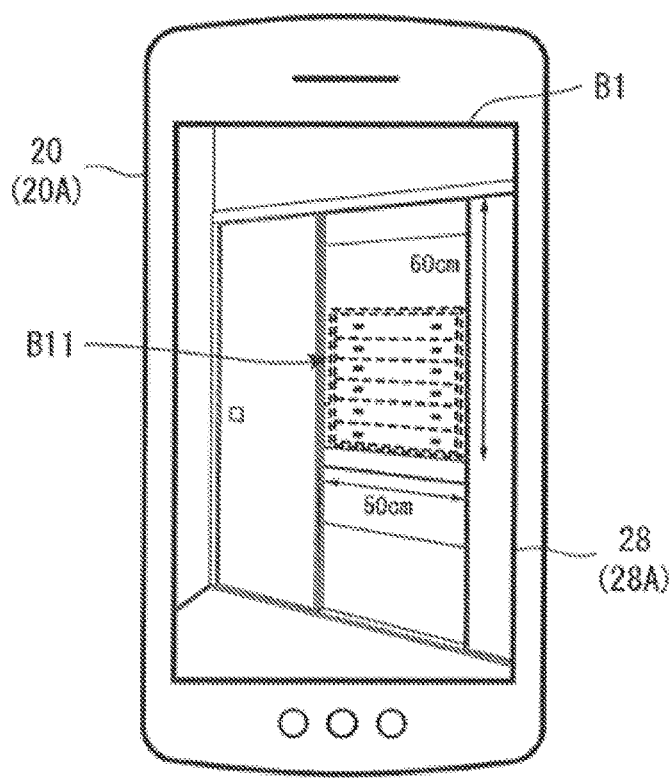
FIG. 9 is a diagram showing an example of information processing according to a fourth embodiment.
Figure 9:
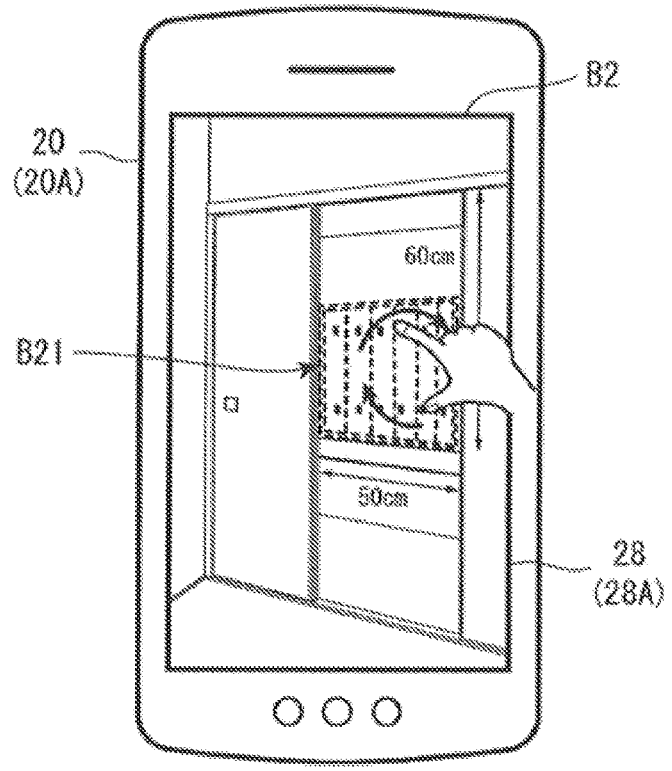

FIG. 9 is a diagram showing an example of information processing according to the fourth embodiment.

As indicated by the reference numeral B1 of FIG. 9, the terminal 20 of the user (e.g., the terminal 20A shown in FIG. 1) captures an image of an area in a closet as a planned product placement location, and shows the size of the area of the closet as measurement data. Referring to FIG. 9, as indicated by the reference numeral B11, an image of a product found from the product database D71 is superimposed on the image of the area in the planned placement location, and thus, the obtained image is displayed.

As indicated by the reference numeral B2 of FIG. 9, the user may be able to rotate the superimposed and displayed image of the product, for example, without limitation thereto. Referring to FIG. 9, as indicated by the reference numeral B21, the user may be able to rotate the image of the product with two fingers, for example, without limitation thereto. Alternatively or additionally, the image of the product may be rotated by pressing a rotation button (not shown) displayed on the terminal 20, for example, without limitation thereto.

That is, information regarding a first product may be displayed in the display area of the terminal 20, and the user of the terminal 20 may be notified of the information regarding the first product, for example, without limitation thereto. Alternatively or additionally, the information regarding the first product may be displayed in a position that is at least partially superimposed on an area on the display area, for example, without limitation thereto. Alternatively or additionally, the controller 21 of the terminal 20 may perform control that rotates the first product displayed in the display area based on the input of the user of the terminal 20, for example, without limitation thereto.

Effects of Fourth Embodiment

The fourth embodiment described above may achieve the following effects in addition to the effects achieved in the foregoing embodiments.

That is, a user may be provided with an image of the product after placement. Alternatively or additionally, a user may be provided with an image of a product placed in any orientation selected by a user, by rotating the image of the product superimposed and displayed on the display 28 of the terminal 20, for example.

Fifth Embodiment

According to the first embodiment described above, the size of a planned placement location of a product whose image was captured by the terminal 20 is transmitted as measurement data to the server 10. Alternatively or additionally, according to a fifth embodiment, the size of a planned product placement location modified by a user is transmitted as measurement data to the server 10.

The size of the area in the measurement data may be adjusted by being reduced or enlarged by being pinched in or pinched out by the screen operation of the user on the two-way arrows indicating the height, the width, and the depth, for example, without limitation thereto.

Figure 10:
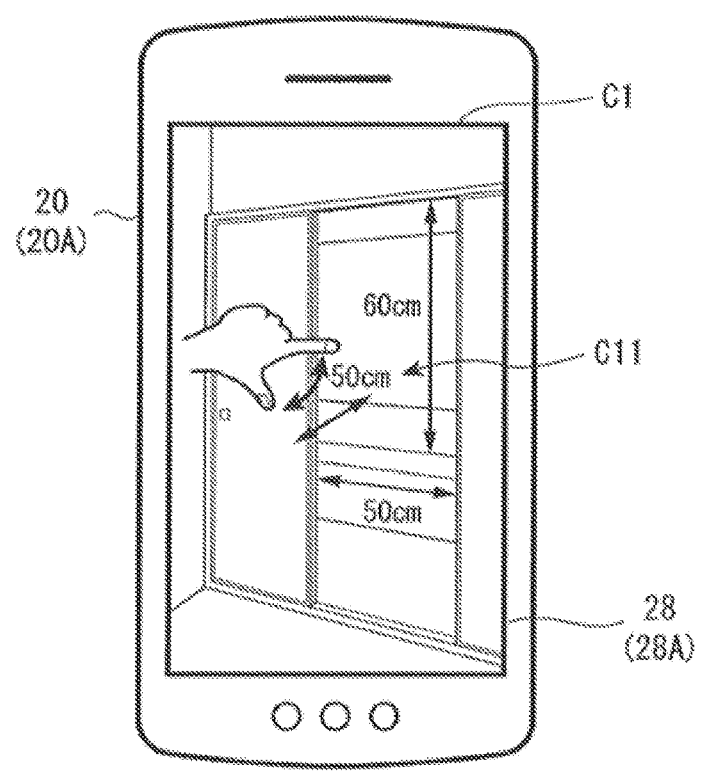
FIG. 10 is a diagram showing an example of information processing according to a fifth embodiment.
Figure 10:
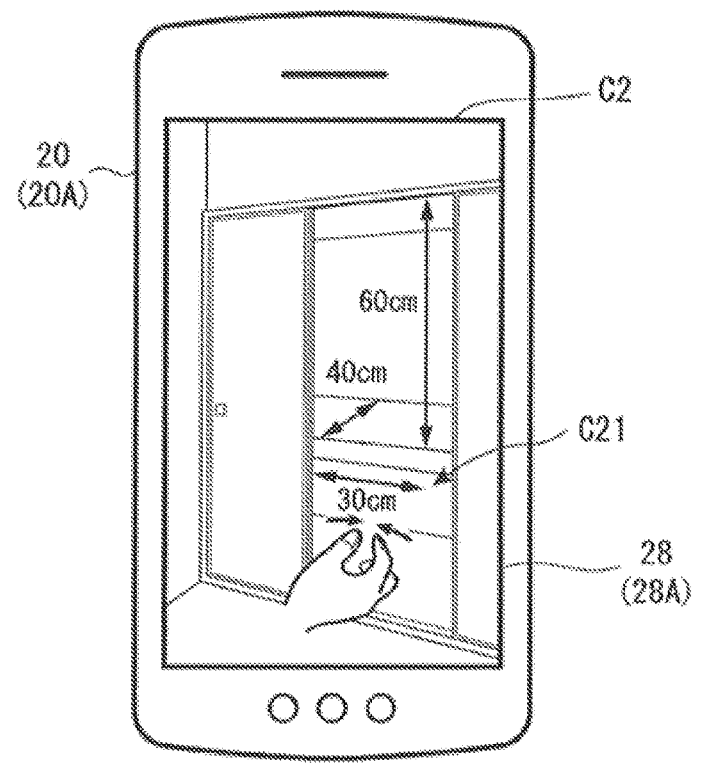

FIG. 10 is a diagram showing an example of information processing according to the fifth embodiment.

As indicated by the reference numeral C1 of FIG. 10, the terminal 20 displays an image of a planned product placement location. Referring to FIG. 10, as indicated by the reference numeral C11, the two-way arrow indicating the depth of the area in the planned product placement location is pinched out by two fingers of the user, so that the depth is enlarged to 50 cm.

Alternatively or additionally, as indicated by the reference numeral C2 of FIG. 10, the terminal 20 displays an image of a planned product placement location. Referring to FIG. 10, as indicated by the reference numeral C21, the two-way arrow indicating the depth of the width of the area in the planned product placement location is pinched in by two fingers of the user, so that the width is reduced to 30 cm.

That is, the controller 21 of the terminal 20 may perform processing that changes the information based on the measurement data in response to the input to the terminal 20 by the user of the terminal 20, for example, without limitation thereto.

Effects of Fifth Embodiment

The fifth embodiment described above may achieve the following effects in addition to the effects achieved in the foregoing embodiments.

That is, the measurement data may be finely adjusted by pinching in and/or out the two-way arrows in an area in a planned product placement location. Then, for example, a product may be searched that has a depth larger than that of a closet but may be placed if a sliding door of the closet is removed.

Sixth Embodiment

According to the first embodiment described above, the number of areas in a planned product placement location contained in a captured image is one. Alternatively or additionally, according to a sixth embodiment, an area in a planned product placement location may be divided into a plurality of areas.

One area may be divided into a plurality of areas by a screen operation of the user on an area whose image was captured, for example, without limitation thereto. Moreover, a plurality of areas may be merged into one area by a screen operation of the user on an area whose image was captured, for example, without limitation thereto.

Figure 11:
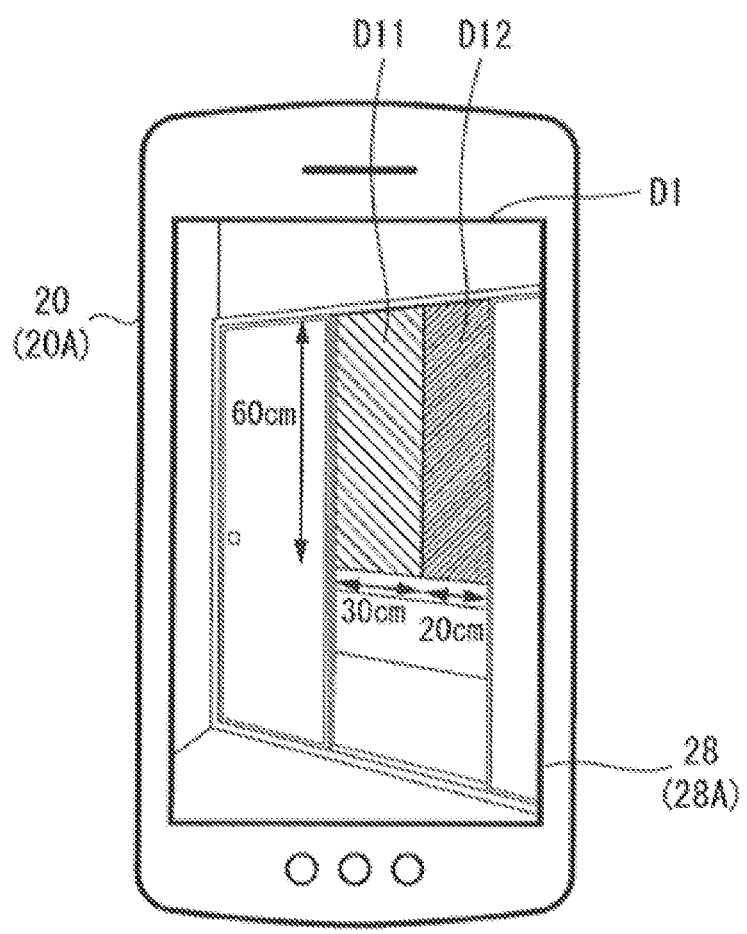
FIG. 11 is a diagram showing an example of information processing according to a sixth embodiment.

FIG. 11 is a diagram showing an example of information processing according to the sixth embodiment.

For example, as indicated by the reference numeral D1 of FIG. 11, an area in a planned product placement location is divided into a first area D11 and a second area D12. An area in a planned product placement location may be divided according to a swipe trajectory by a user swiping any part of the area with one finger, for example, without limitation thereto. Referring to FIG. 11, the swipe trajectory corresponds to a boundary line between the first area D11 and the second area D12. Alternatively or additionally, a plurality of areas may be merged into one area by a user swiping on the boundary line between the first area D11 and the second area D12 with one finger, for example, without limitation thereto.

Effects of Sixth Embodiment

The sixth embodiment described above may achieve the following effects in addition to the effects achieved in the foregoing embodiments.

That is, an area may be divided into a plurality of areas and/or a plurality of areas may be merged into one area, and thus, a determination may be made of the number of products that are to be placed in a specific area.

Seventh Embodiment

According to the first embodiment described above, the size of an area in a planned product placement location is measured. Alternatively or additionally, according to a seventh embodiment, the size of an area in a product carrying-in route is measured.

Images of a plurality of areas in a product carrying-in route are captured in addition to those in a product placement location, and the measurement data of these plurality of areas is transmitted to the server 10. For example, measurement data for a plurality of areas such as a door and a corner is transmitted to the server 10. Images of a plurality of areas may be captured as moving images, and the terminal 20 of the user may be notified of an area in which there may be a problem in carrying in a product, for example, without limitation thereto. Furthermore, images of a plurality of areas may be captured as moving images, and the terminal 20 of the user may be requested to capture still images of an area in which there may be a problem in carrying in a product, for example, without limitation thereto.

Figure 12:
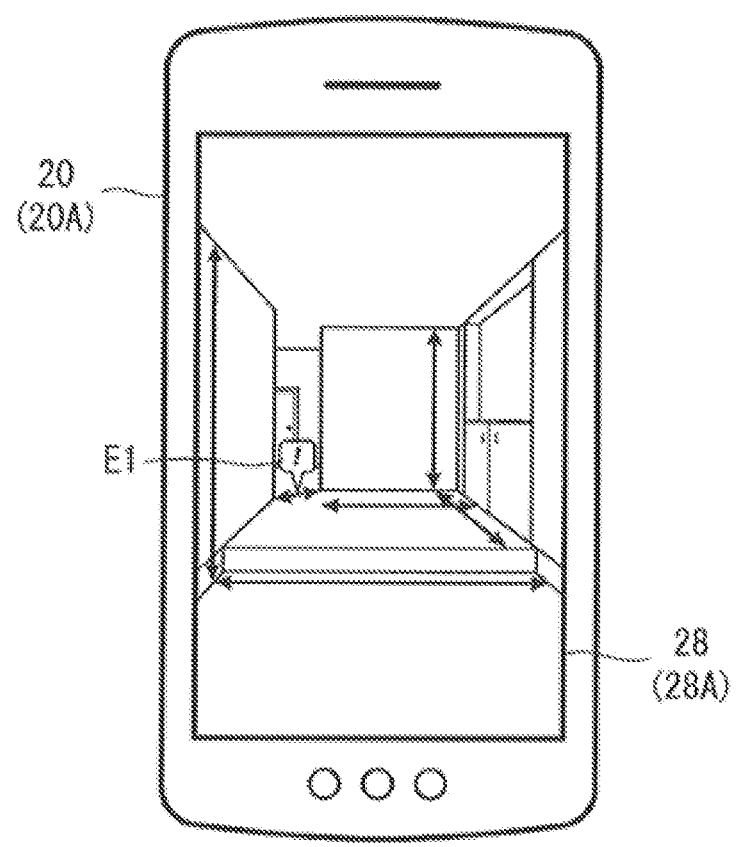
FIG. 12 is a diagram showing an example of information processing according to a seventh embodiment.

FIG. 12 is a diagram showing an example of information processing according to the seventh embodiment.

Referring to FIG. 12, an image of an area near an entrance of a house is captured as a product carrying-in route, and the lengths of walls and floors constituting the area are measured. The product database D71 may be searched for a product that fits in the lengths measured in the example shown in FIG. 12, for example, without limitation thereto. As indicated by the reference numeral E1 of FIG. 12, a speech balloon may be added to an area in which there may be a problem in carrying in a product, and the user may be notified of the possible problem, for example, without limitation thereto.

That is, measurement data obtained by measuring an area contained in the image as indicated by the reference numeral A11 in FIG. 2 may be first measurement data, for example, without limitation thereto. Furthermore, second measurement data obtained by measuring an area in a product carrying-in route may be acquired by a terminal, for example, without limitation thereto. Alternatively or additionally, the terminal 20 may notify the user of the terminal 20 of information on a first product that may pass (e.g., fits) through a carrying-in route selected based on the first measurement data and the second measurement data, from information regarding a plurality of products stored in the storage device (e.g., the storage 13 shown in FIG. 1) having the product database D71, for example, without limitation thereto.

Effects of Seventh Embodiment

The seventh embodiment described above may achieve the following effects in addition to the effects achieved in the foregoing embodiments.

That is, a situation in which a product cannot pass through the carrying-in route to the planned placement location may be prevented if the product may fit in the planned placement location, by causing the terminal 20 to notify the user of information on a product that may pass through the carrying-in route.

Eighth Embodiment

According to the first embodiment described above, a product that fits in a planned placement location is suggested from the product database D71 concerning products that are being sold on a shopping site. Alternatively or additionally, according to an eighth embodiment, a user posts measurement data to a flea market site and/or a flea market application, and encourages other users to sell products that may be placed in an area based on the measurement data.

Figure 13:
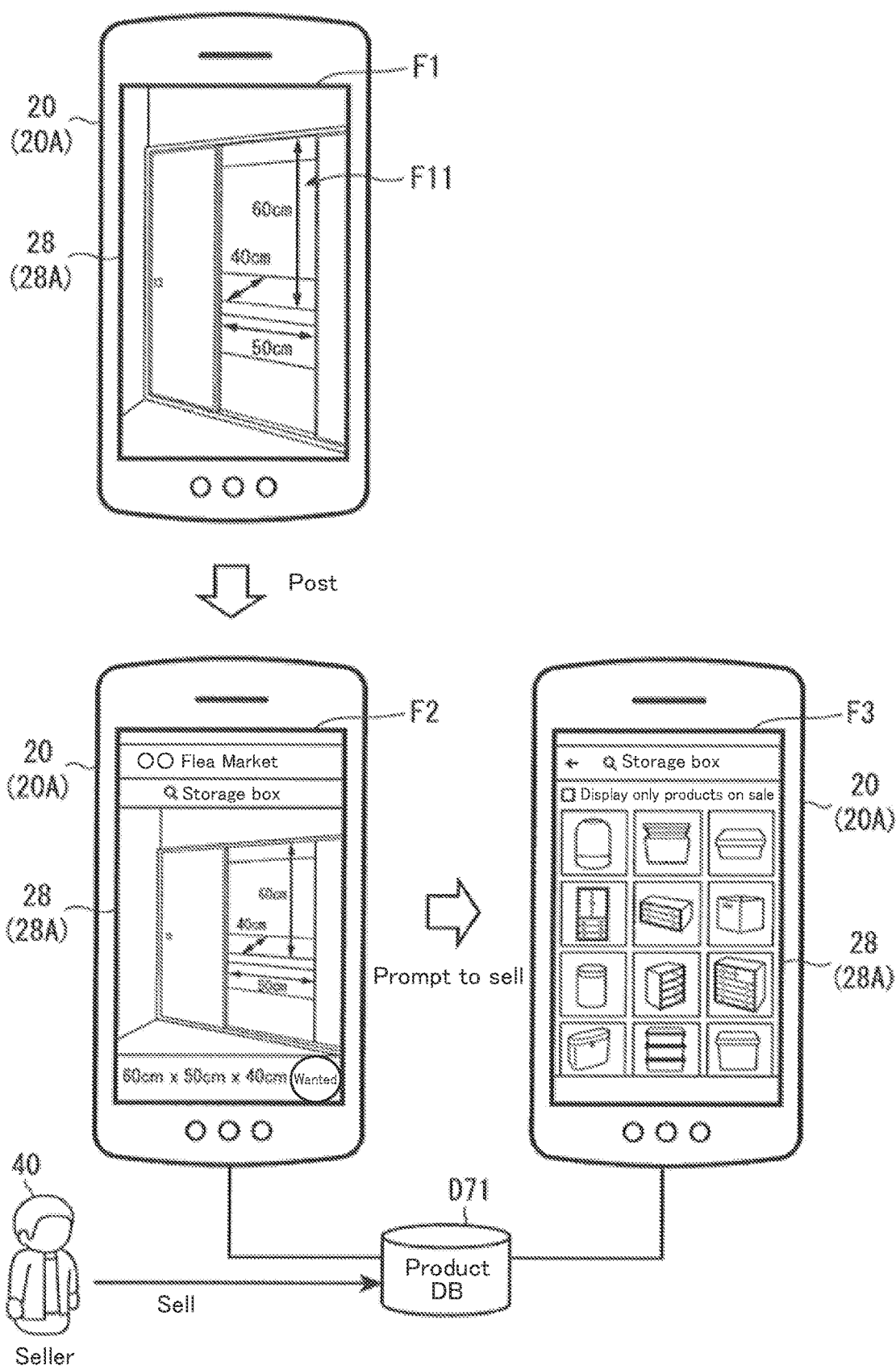
FIG. 13 is a diagram showing an example of information processing according to an eighth embodiment.

FIG. 13 is a diagram showing an example of information processing at the terminal 20 of the purchaser of the product according to the eighth embodiment.

As indicated by the reference numeral F1 of FIG. 13, the display 28 (e.g., the display 28A of the terminal 20A shown in FIG. 1) of the terminal 20 (e.g., the terminal 20A shown in FIG. 1) acquires a captured image. The image may be captured by the camera 27 of the terminal 20, for example, without limitation thereto. Furthermore, the image may be captured by another device (not shown) and acquired by the terminal 20 from the another device, for example, without limitation thereto.

Referring to FIG. 13, as indicated by the reference numeral F11, the display 28 of the terminal 20 acquires measurement data obtained by measuring an area contained in the captured image.

As indicated by the reference numeral F2 of FIG. 13, when the measurement data acquired by the terminal 20 is posted to the server 10, the display 28 of the terminal 20 displays a screen of a flea market site provided by the server 10. For example as shown in FIG. 13, "storage box" is posted as a search word for a product that the user wants to purchase. Alternatively or additionally, the posting may include the measurement data. Then, when a "Wanted" button is pressed, a seller 40 is prompted to sell a "storage box" that satisfies conditions defined by the measurement data. In some embodiments, the search word is input through the input device 25 or the microphone 26 of the terminal 20 shown in FIG. 1, for example. The measurement data and the search word may be collectively referred to as search information, for example, without limitation thereto.

The terminal 20 (e.g., the terminal 20B shown in FIG. 1) of the seller 40 receives search information, which is a combination of measurement data and a search word, from the server 10. Accordingly, the seller 40 sells a product that may be placed in the planned product placement location of the user who posted the measurement data. The information regarding the product that is being sold by the seller 40 is registered in the product database D71 of the server 10.

Then, as indicated by the reference numeral F3 of FIG. 13, a list of products that are being sold by the seller 40 is displayed on the display 28 of the terminal 20 of the user.

Alternatively or additionally, if or when the measurement data is posted to a flea market site, a search for a product that has already been registered in the product database D71 may be performed in a substantially similar manner as the information processing shown in shown in FIG. 2, for example, without limitation thereto. If a size of a product is not registered in the product database D71 for the flea market site, the size of the product may be recognized by A1 using an image of the product, for example, without limitation thereto. For example, the recognition of the size of the product by the A1 may comprise recognizing a product name from an image of the product based on a database accumulated through deep learning. Then, the recognized product name may be found from the online or offline database, and the size of the product is recognized. Alternatively or additionally, the size of the product may be recognized by comparing the size of the product with that of an item appearing together with the product, for example, without limitation thereto. In another example, based on textual information such as descriptions and tags of the product on sale, the size of the product having similar textual information in the product database D71 may be acquired, for example, without limitation thereto.

Figure 14:
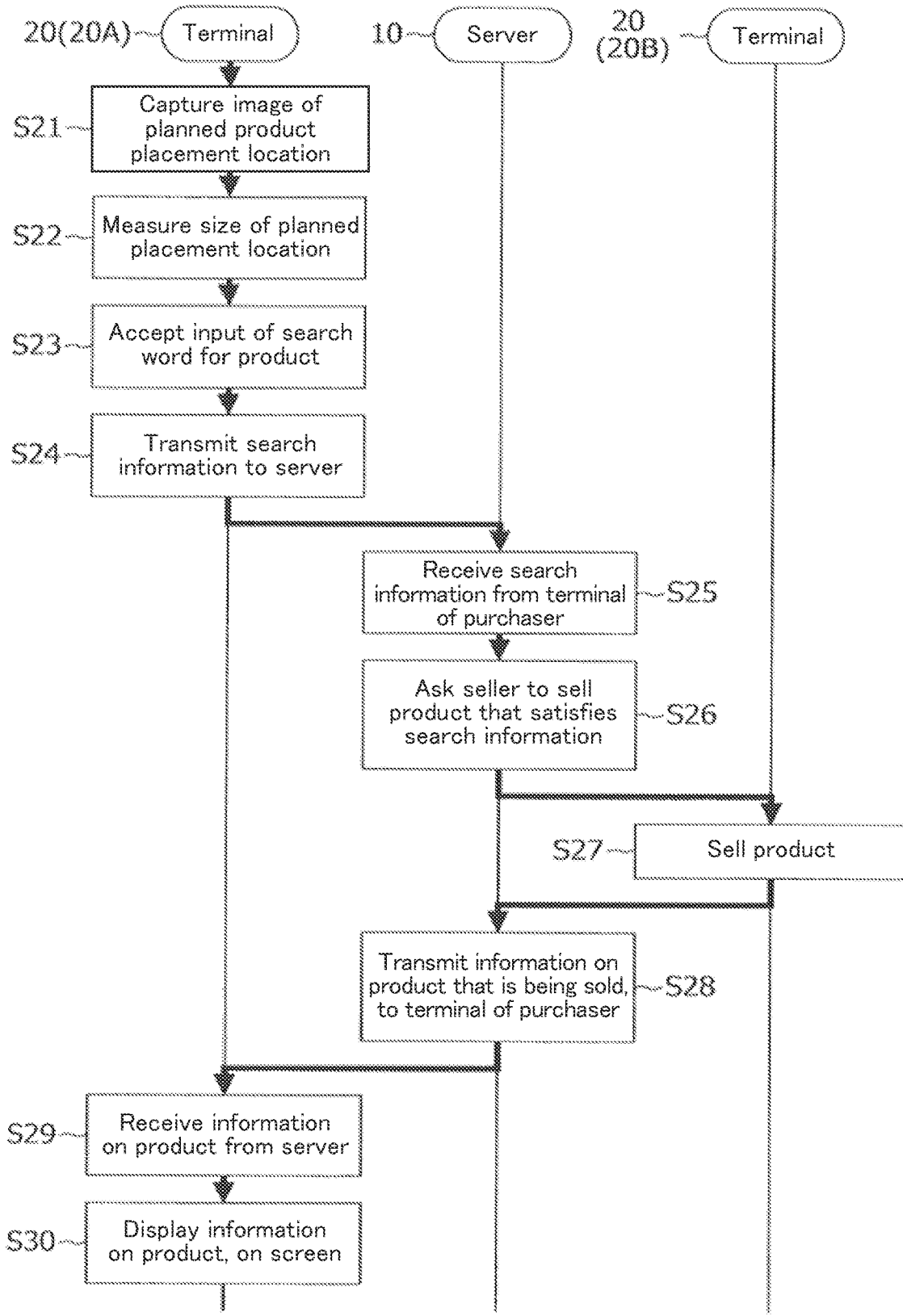
FIG. 14 is a diagram showing an example of a sequence of information processing according to the eighth embodiment.

The sequence of the information processing according to the eighth embodiment will be described with reference to FIG. 14. FIG. 14 is a diagram showing an example of a sequence of the information processing according to the eighth embodiment.

In step S21, a terminal 20 of a purchaser of a product (e.g., the terminal 20A shown in FIG. 1) captures an image of a planned product placement location, using the camera 27, for example. If an image of a planned product placement location is captured by another device (not shown), the processing in step S1 is replaced by processing in which the terminal 20A acquires the captured image from the another device.

In step S22, the terminal 20A measures the size of an area in the planned placement location, thereby generating measurement data. If the size of an area is measured by another device (not shown), the processing in step S21 is omitted, and the processing in step S22 is replaced by processing in which the terminal 20A acquires the measurement data from the another device.

In step S23, the terminal 20A accepts input of a search word for a product, using the input device 25 or the microphone 26, for example.

In step S24, the terminal 20A generates search information in which the measurement data is associated with the search word, and transmits, via the communication I/F 22, the generated search information to the server 10.

In step S25, the server 10 receives, via the communication I/F 12, the search information from the terminal 20.

In step S26, the server 10 notifies the terminal 20 (e.g., the terminal 20B shown in FIG. 1) of the seller 40 of the received search information via the communication I/F 12, thereby requesting the seller 40 to sell a product that satisfies the search information.

In step S27, the terminal 20B registers information regarding the product in the product database D71 of the server 10, thereby selling the product on the flea market site.

In step S28, the server 10 transmits the information on the product that is being sold by the seller 40, to the terminal 20A of the purchaser, via the communication I/F 12. The information on the product on sale may be transmitted to the terminal 20A of the purchaser at a point in time when the product is put on sale by the seller 40, for example, without limitation thereto. Alternatively or additionally, the information on the product on sale may be transmitted to the terminal 20A of the purchaser on a regular basis, for example, without limitation thereto. In another example, the information on the product on sale may be transmitted to the terminal 20A of the purchaser, for example in response to receiving, from the terminal 20A, an inquiry of the purchaser, without limitation thereto.

In step S29, the terminal 20A receives, via the communication I/F 22, the information on the product from the server 10, from the server 10.

In step S30, the terminal 20A displays the information on the product received from the server 10, on the screen of the display 28.

Figure 15:
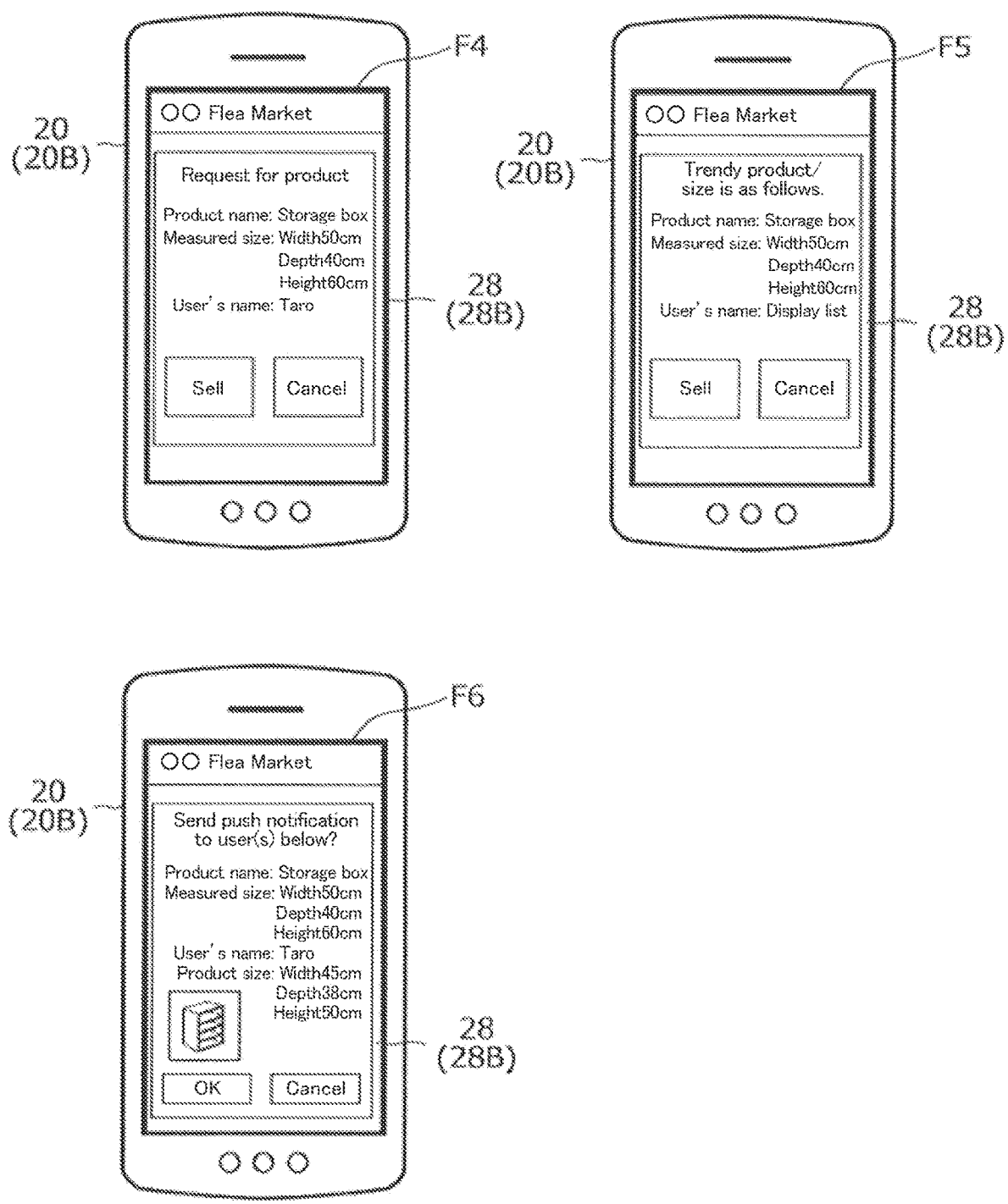
FIG. 15 is a diagram showing an example of information processing at a terminal of a seller of a product according to the eighth embodiment.

FIG. 15 is a diagram showing an example of information processing at a terminal 20 of a seller of a product according to the eighth embodiment.

The server 10 may transmit information regarding the size included inside the area, to the terminal 20B of a seller of a product whose information is stored in the server 10, in response to the reception of the measurement data, for example, without limitation thereto. Information regarding the size based on the measurement data from a user of one terminal 20A may be transmitted to the terminal 20B of the seller of the product, for example, without limitation thereto. Alternatively or additionally, information regarding a popular size, based on the measurement data from users of a plurality of terminals 20, may be transmitted to the terminal 20B of the seller of the product, for example, without limitation thereto. Alternatively or additionally, information regarding the average size based on the measurement data from users of a plurality of terminals 20 may be transmitted to the terminal 20B of the seller of the product, for example, without limitation thereto.

An example indicated by the reference numeral F4 in FIG. 15 shows a screen that makes a notification to the terminal 20B of the seller in the case in which measurement data is transmitted from a user of a terminal 20A. A screen 28B of the terminal 20B contains a product name, a measured size, and a name of the user, for example, without limitation thereto. The product name may be a search word input by a purchaser, the measured size may the size of an area in a planned product placement location contained in the measurement data, and the name of the user may be a name of a purchaser of a product. Continuing to refer to the reference numeral F4, the product name is a storage box, the measured size is a width of 50 cm, a depth of 40 cm, and a height of 60 cm, and the name of the user is Taro. When the "Sell" button is tapped by the seller of the product, the screen transitions to a screen where the operation of selling the product is performed. Alternatively or additionally, if there is no product to be sold, the "Cancel" button is tapped to hide the notification indicated by the reference numeral F4.

An example indicated by the reference numeral F5 in FIG. 15 shows a screen that makes a notification to the terminal 20B of the seller in the case in which measurement data is transmitted from users of a plurality of terminals 20A. The screen 28B of the terminal 20B contains a name of a popular product, a popular or average measured size by a plurality of users, and a list of names of users, for example, without limitation thereto. In the example shown in the drawing, when the "List" portion of the names of the users is tapped, a list of users who have transmitted measurement data is displayed. Continuing to refer to the reference numeral F5, the name of a popular product is a storage box, and the popular or average measured size by a plurality of users is a width of 50 cm, a depth of 40 cm, and a height of 60 cm. When the "Sell" button is tapped by the seller of the product, the screen transitions to a screen where the operation of selling the product is performed. Alternatively or additionally, if there is no product to be sold, the "Cancel" button is tapped to hide the notification indicated by the reference numeral F5.

The server 10 may transmit information regarding the user of the terminal 20A to a seller of a first product selected based on the measurement data and the size data of each of the plurality of products, for example, without limitation thereto. The seller of the product may, by means of the terminal 20B, encourage the user of the terminal 20A to purchase the product that he or she is selling based on the information regarding the user of the terminal 20A, for example, without limitation thereto. The information regarding the user of the terminal 20A contains a name, an ID, and an e-mail address of the user, for example, without limitation thereto.

An example indicated by the reference numeral F6 in FIG. 15, shows a screen that makes a notification to the terminal 20B of the seller after the operation of selling the product is completed. The screen 28B of the terminal 20B contains a product name based on the search word, a measurement size based on the measurement data, a name of the user who transmitted the measurement data, and a product size of the product that is being by the seller, for example, without limitation thereto. Continuing to refer to the reference numeral F6, the product name is a storage box, the measured size is a width of 50 cm, a depth of 40 cm, and a height of 60 cm, and the name of the user is Taro. Furthermore, the product size is a width of 45 cm, a depth of 38 cm, and a height of 50 cm, and the lengths of all three sides of the product is less than or equal to the measured size. When the "OK" button is tapped by the seller of the product, a push notification encouraging the purchase of the product is transmitted to the user of the terminal 20A. Alternatively or additionally, when the "Cancel" button is tapped, the notification shown indicated by the reference numeral F6 is hidden.

When the server 10 detects that a product that satisfies the search information is being sold by the terminal 20B of the seller, the server 10 may notify the user of the terminal 20A that a product that satisfies the search information is being sold, for example, without limitation thereto.

Figure 16:
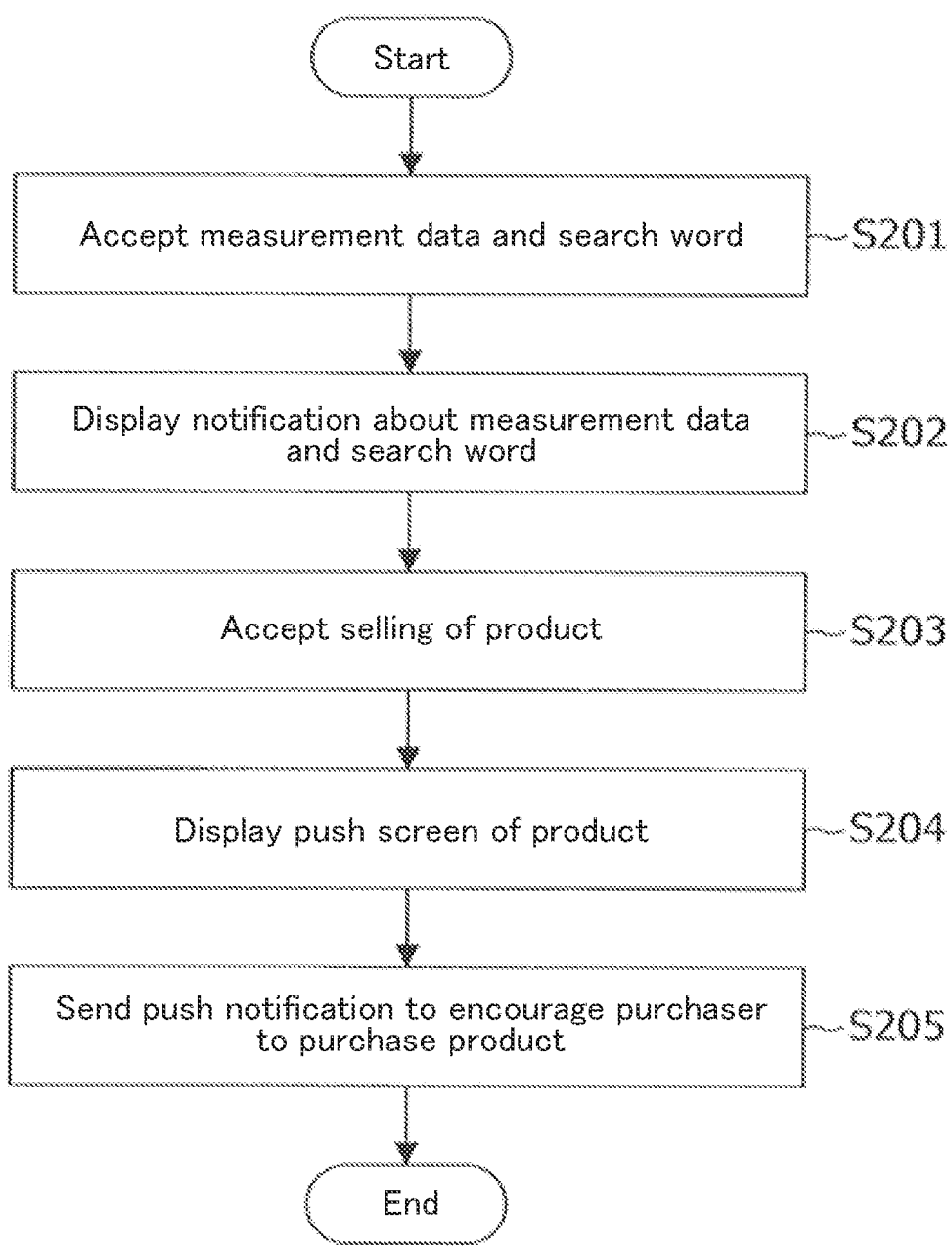
FIG. 16 is a diagram showing an example of the flow of information processing at a server that makes a notification to a terminal of a seller of a product according to the eighth embodiment.

The flow of information processing in the server 10 that makes a notification to the terminal 20 of a seller of a product according to the eighth embodiment will be described with reference to FIG. 16. FIG. 16 is a diagram showing an example of the flow of information processing in the server 10 that makes a notification to the terminal 20 of the seller of the product according to the eighth embodiment.

In step S201, the server 10 accepts measurement data and a search word from the terminal 20A of the purchaser of the product. Alternatively or additionally, in step S201, the terminal 20A of the purchaser of the product transmits the measurement data and the search word to the server 10.

In step S202, the server 10 causes the screen 28B of the terminal 20B of the seller of the product to display a notification about the measurement data and the search word indicated by the reference numeral F4 or F5 in FIG. 15, for example. Alternatively or additionally, the terminal 20B of the seller receives, from the server 10, information about the measurement data and the search word, in step S202.

In step S203, the server 10 accepts information indicating that the product is being sold, from the terminal 20B of the seller of the product. Alternatively or additionally, in step S203, the terminal 20B of the seller of the product transmits information indicating that the product is being sold to the server 10.

In step S204, the server 10 causes the screen 28B of the terminal 20B of the seller to display a push screen of the product indicated by the reference numeral F6 in FIG. 15, for example. Alternatively or additionally, the terminal 20B of the seller receives, from the server 10, information about the sold product, in step S204.

In step S205, when a push operation is performed on the product by the seller at the terminal 20B of the seller, the server 10 transmits a push notification to the terminal 20A of the purchaser of the product to encourage the purchaser to purchase the product on sale.

Then, the information processing in the server 10 that makes a notification to the terminal 20 of the seller of the product according to the eighth embodiment is ended.

Effects of Eighth Embodiment

The eighth embodiment described above may achieve the following effects in addition to the effects achieved in the foregoing embodiments.

That is, sellers may be encouraged to sell, in a flea market site, for example, a product with a size included inside an area in a planned product placement location. Furthermore, sellers of products may be encouraged to sell a product with a size included inside an area in a planned placement location, by transmitting information regarding measurement data to the sellers of products.

Furthermore, sellers, who are selling a product with a size included inside an area in a planned placement location, may be encouraged to perform sales activities to users who are trying to purchase the product, by transmitting information regarding the users to the sellers.

Ninth Embodiment

According to the eighth embodiment described above, the product database D71 of a flea market site is included in the server 10. Alternatively or additionally, according to a ninth embodiment, the product database D71 of a flea market site is included in the shopping server 50 that is different from the server 10.

Figure 17:
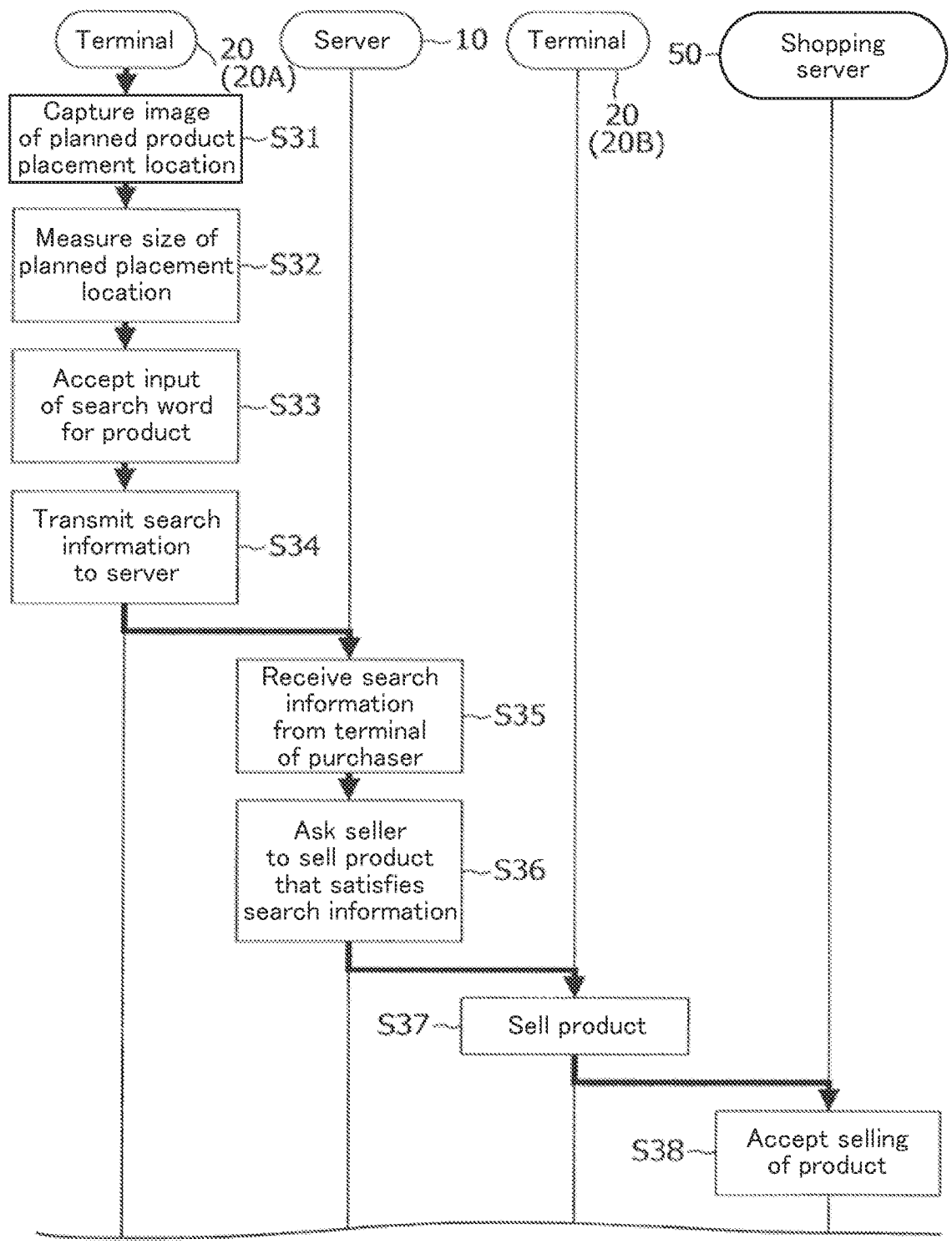
FIG. 17 is a diagram showing an example of a sequence of information processing according to a ninth embodiment.
Figure 18:
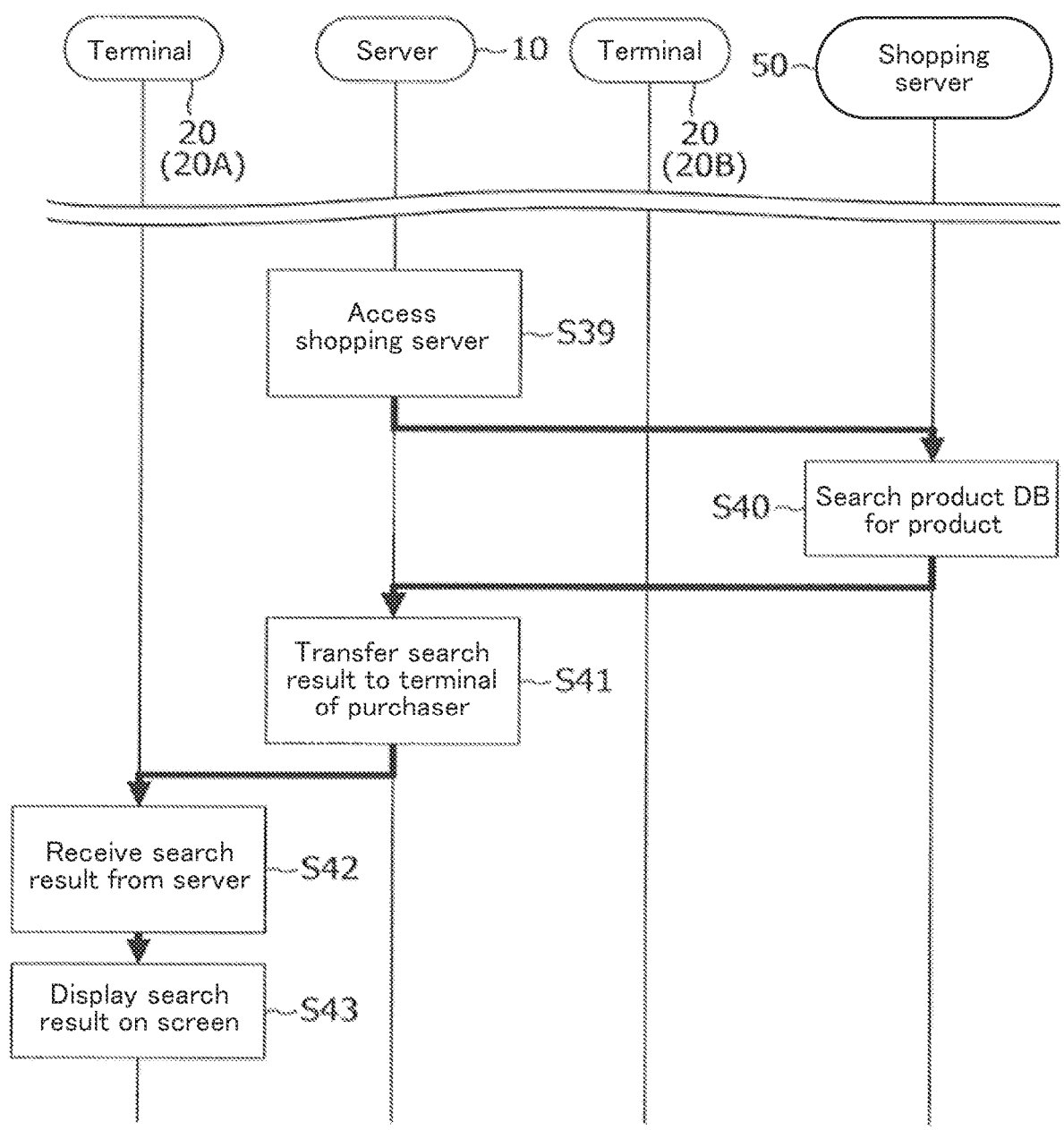
FIG. 18 is a diagram showing an example of a sequence of information processing according to the ninth embodiment.

FIGS. 17 and 18 are diagrams showing an example of a sequence of the information processing according to the ninth embodiment. Hereinafter, the sequence of the information processing according to the ninth embodiment will be described with reference to FIGS. 17 and 18.

The shopping server 50 may have a substantially similar HW configuration as that of the server 10 shown in FIG. 1, for example, without limitation thereto.

As shown in FIG. 17, in step S31, the terminal 20 (e.g., the terminal 20A shown in FIG. 1) captures an image of a planned product placement location, using the camera 27, for example. If an image of a planned product placement location is captured by another device (not shown), the processing in step S31 is replaced by processing in which the terminal 20A acquires the captured image from the other device.

In step S32, the terminal 20A measures the size of an area in the planned placement location, thereby generating measurement data. If the size of an area is measured by another device (not shown), the processing in step S31 is omitted, and the processing in step S32 is replaced by processing in which the terminal 20A acquires the measurement data from the another device.

In step S33, the terminal 20A accepts input of a search word for a product, using the input device 25 or the microphone 26, for example.

In step S34, the terminal 20A generates search information in which the measurement data is associated with the search word, and transmits, via the communication I/F 22, the generated search information to the server 10.

In step S35, the server 10 receives, via the communication I/F 12, the search information from the terminal 20.

In step S36, the server 10 notifies the terminal 20 (e.g., the terminal 20B shown in FIG. 1) of the seller 40 of the received search information via the communication I/F 12, thereby requesting the seller 40 to sell a product that satisfies the search information.

In step S37, the terminal 20B registers information regarding the product in the product database D71 of the shopping server 50, thereby selling the product on the flea market site.

In step S38, the shopping server 50 accepts information indicating that the product is being sold, from the terminal 20B of the seller 40.

As shown in FIG. 18, in step S39, the server 10 accesses the shopping server 50 via the communication I/F 22, and converts the search information received from the terminal 20A into a format acceptable to the shopping server 50 and transfers the information. The server 10 may access the shopping server 50 at a point in time when the product is put on sale by the seller 40, for example, without limitation thereto. Alternatively or additionally, the server 10 may access the shopping server 50 on a regular basis, for example, without limitation thereto. In another example, the server 10 may access the shopping server 50 at a point in time when an inquiry is received from the terminal 20A of the purchaser, for example, without limitation thereto.

In step S40, the shopping server 50 searches the product database D71 for a product, in response to the access from the server 10.

In step S41, the server 10 transfers, via the communication I/F 12, information on a product contained in the search result acquired from the shopping server 50, to the terminal 20A of the purchaser.

In step S42, the terminal 20A receives, via the communication I/F 22, the information on the product contained in the search result from the server 10.

In step S43, the terminal 20A displays the information on the product contained in the search result, on the screen of the display 28.

Effects of Ninth Embodiment

The ninth embodiment described above may achieve the following effects in addition to the effects achieved in the foregoing embodiments.

That is, sellers may be encouraged to sell a product with a size included inside an area in a planned product placement location. Alternatively or additionally, sellers may be encouraged to sell a product in the case in which a flea market site service is provided through the shopping server 50 by a service provider different from that of the server 10 that acquires measurement data from the terminal 20 of the user.

Tenth Embodiment

According to the first embodiment described above, a product that fits in a planned placement location is suggested from the product database D71 assuming that the shape of the shape of the product does not change. However, a product having a door, such as an automobile, cannot be used if the door cannot be opened and closed if the product fits in a planned placement location, such as a garage. Thus, according to the tenth embodiment, a product that fits in a planned placement location when the shape of the product changes due to opening and closing of a door or the like is suggested.

Figure 19:
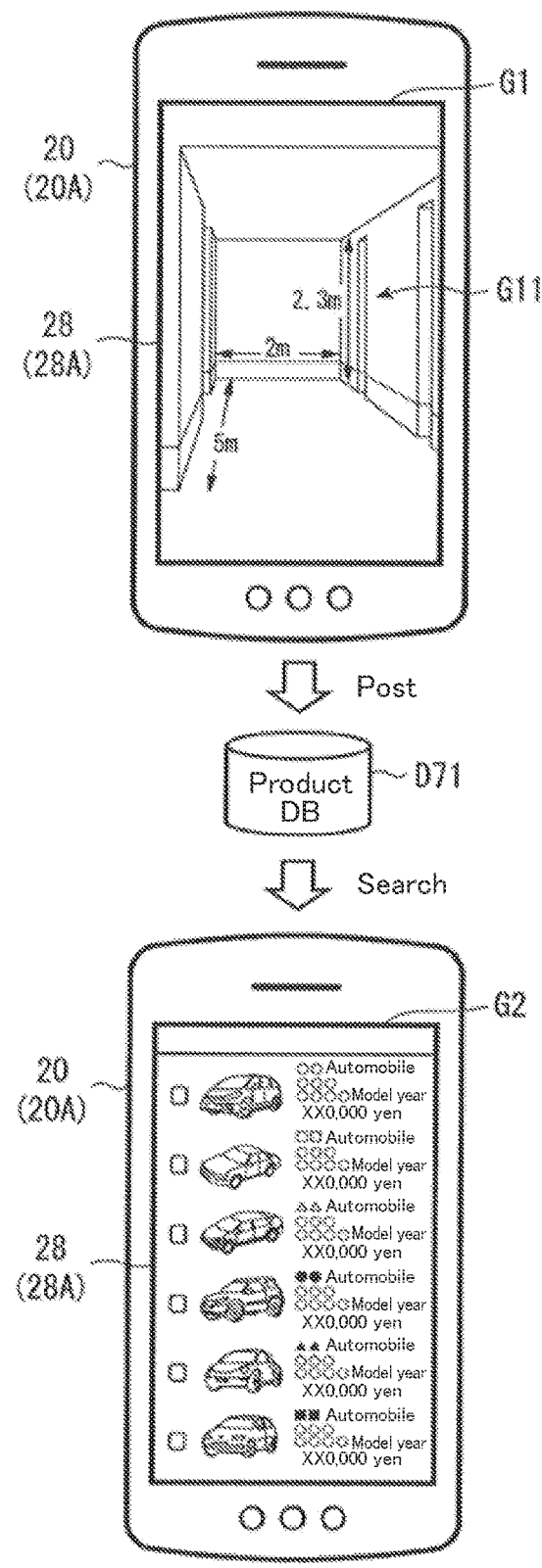
FIG. 19 is a diagram showing an example of information processing according to a tenth embodiment.

FIG. 19 is a diagram showing an example of information processing according to the tenth embodiment.

As indicated by the reference numeral G1 of FIG. 19, the display 28 (e.g., the display 28A of the terminal 20A shown in FIG. 1) of the terminal 20 (e.g., the terminal 20A shown in FIG. 1) acquires a captured image. In the example shown in the drawing, an image of a garage for parking an automobile is captured. The image may be captured by the camera 27 of the terminal 20, for example, without limitation thereto. Furthermore, the image may be captured by another device (not shown) and acquired by the terminal 20 from the another device, for example, without limitation thereto.

As indicated by the reference numeral G11 of FIG. 19, the display 28 of the terminal 20 acquires measurement data obtained by measuring an area contained in the captured image. For example, the measurement data is the size of an area in which the user of the terminal 20 wants to place a product, and, in the example shown in the drawing, the area has a height of 2.3 m, a width of 2 m, and a depth of 5 m. The size of an area contained in the measurement data is not limited to the case where the size of the area is indicated by three sides, but may be indicated by two sides or less, or by four sides or more. The measurement data may be calculated from the captured image by the controller 21 of the terminal 20, for example, without limitation thereto. Alternatively or additionally, the measurement data may be calculated from the captured image by another device (not shown) and acquired by the terminal 20 from the other device, for example, without limitation thereto.

Referring to FIG. 19, as indicated by the reference numeral G2, the product database D71 contained in the content information D7 in the server 10 is searched for a list of products that match the search information, and the list of products is displayed on the display 28 of the terminal 20. For example, as shown in FIG. 19, a list of automobiles with a size included inside an area in a garage that is the planned placement location is displayed.

For example, the shape of an automobile changes when a door, trunk, or the like is opened. As such, according to the tenth embodiment, an automobile with a size included inside an area in a garage that is the planned placement location when a door, trunk, or the like is open is searched for. Furthermore Alternatively or additionally, furniture, refrigerators, or the like with doors and drawers may be searched for, for example, without limitation thereto.

The size of a product when a door, trunk, or the like is open may be information regarding calculated from the information the door, trunk, or the like registered in the product database D71, for example, without limitation thereto. Alternatively or additionally, the search may be limited to products whose doors, trunks, and the like may be fully opened when the products are placed in the planned placement location, for example, without limitation thereto. For another example, the search may be performed for products whose doors, trunks, and the like may be opened than a predetermined width when the products are placed in the planned placement location, for example, without limitation thereto.

Alternatively or additionally, the measurement data of the road width of a road facing the garage as well as the garage may be acquired, for example, without limitation thereto.

That is, the terminal 20 may notify the user of the terminal 20 of information on at least a first product selected based on the measurement data and information regarding the sizes of a plurality of products when their shapes are changed, from information regarding a plurality of products stored in the storage device (e.g., the storage 13 shown in FIG. 1) having the product database D71, for example, without limitation thereto.

Effects of Tenth Embodiment

The tenth embodiment described above may achieve the following effects in addition to the effects achieved in the foregoing embodiments.

That is, an appropriately sized product that fits in a planned placement location may be searched when the shape of the product changes. For example, a product with a size included inside an area in a planned placement location may be searched when the shape of the product changes, thereby preventing a situation in which a door or a drawer cannot be opened if the purchased product fits in the planned placement location. Alternatively or additionally, a determination may be made as to whether or not an optional product may be placed on the roof of an automobile. Moreover, since the road width of a road facing the garage is measured, a situation in which the automobile cannot pass through the route to enter the garage may be prevented.

Eleventh Embodiment

According to the first embodiment described above, measurement data for one area is used, and a product that fits in the area is suggested. Alternatively or additionally, according to an eleventh embodiment, a product that is to be placed in at least one of a plurality of areas whose sizes have been measured is suggested.

Figure 20:
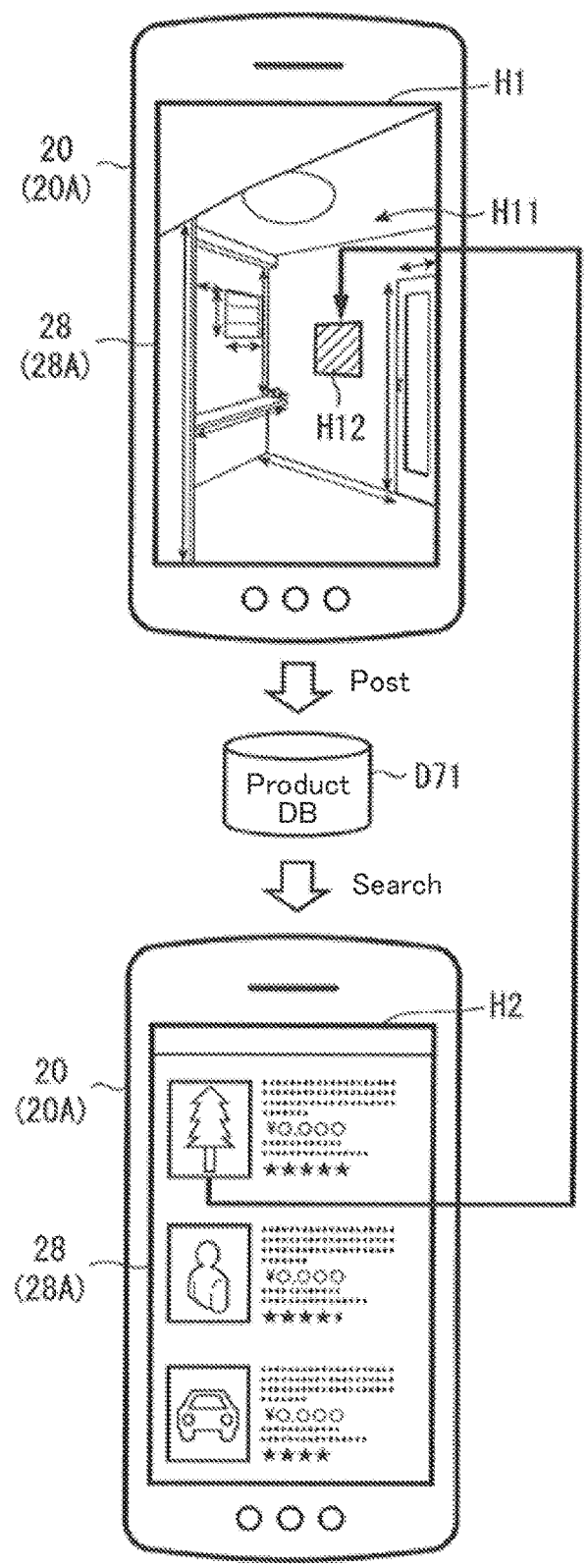
FIG. 20 is a diagram showing an example of information processing according to an eleventh embodiment.

FIG. 20 is a diagram showing an example of information processing according to the eleventh embodiment.

As indicated by the reference numeral H1 of FIG. 20, the display 28 (e.g., the display 28A of the terminal 20A shown in FIG. 1) of the terminal 20 (e.g., the terminal 20A shown in FIG. 1) acquires a captured image. In the example shown in the drawing, an image of a room is captured. The image may be captured by the camera 27 of the terminal 20, for example, without limitation thereto. Furthermore, the image may be captured by another device (not shown) and acquired by the terminal 20 from the another device, for example, without limitation thereto.

As indicated by the reference numeral H11 of FIG. 20, the display 28 of the terminal 20 acquires measurement data obtained by measuring a plurality of areas contained in a captured image. The measurement data is the sizes of areas in workpieces provided in the room. The measurement data may be calculated from the captured image by the controller 21 of the terminal 20, for example, without limitation thereto. Alternatively or additionally, the measurement data may be calculated from the captured image by another device (not shown) and acquired by the terminal 20 from the another device, for example, without limitation thereto.

When the acquired measurement data is posted to the server 10, a recommended product placement area in the room in the image is displayed on the display 28 of the terminal 20 as indicated by the reference numeral H12 of FIG. 20. The recommended product placement area may be determined based on an image or the like of an example of the placement of the product included in the product database D71 of the server 10, for example, without limitation thereto. Alternatively or additionally, the recommended product placement area may be determined based on information accumulated by the server 10 through machine learning by AI.

Referring to FIG. 20, as indicated by the reference numeral H2, the product database D71 contained in the content information D7 in the server 10 is searched for a list of products that match the measurement data, and the list of products is displayed on the display 28 of the terminal 20. For example, as shown in FIG. 20, a list of paintings that may be placed in the recommended product placement area is displayed. The search for products may be performed based on the age and color of the room, for example, without limitation thereto.

That is, the terminal 20 may notify the user of the terminal 20 at least of information on a second product that is to be placed in an area different from the above-mentioned area, selected based on the measurement data, from information regarding a plurality of products stored in the storage device (e.g., the storage 13 shown in FIG. 1) having the product database D71, for example, without limitation thereto.

Effects of Eleventh Embodiment

The eleventh embodiment described above may achieve the following effects in addition to the effects achieved in the foregoing embodiments.

That is, an optimal interior may be proposed, by analyzing the size and/or colors of a room.

Others

It should be noted that, although the embodiments of the present disclosure have been described based on the drawings and examples, it will be easy for those skilled in the art to make various changes and modifications based on the present disclosure. Accordingly, those changes and modifications are encompassed in the scope of the present disclosure. Functions and the like included in means, steps, or the like may be rearranged such that no logical inconsistency arises, and a plurality of means, steps, or the like may be combined into single means, step, or the like, or single means, step, or the like may be divided, without limitation thereto. Also, configurations shown in the embodiments may be combined as appropriate.

What is claimed is:

1. An information processing method of a terminal, comprising:
    capturing, using an imaging sensor of the terminal, an image comprising a product area;
    measuring the product area contained in the captured image to obtain measurement data of the product area, the measurement data comprising at least one of a first distance in a first direction, a second distance in a second direction, and a third distance in a third direction, the first direction, the second direction, and the third direction being different from each other;
    obtaining at least one first product that has been selected, based on the measurement data, from a plurality of products stored in a storage device, the at least one first product having dimensions that fit the product area contained in the captured image;
    notifying, a user of the terminal, of second information of the at least one first product;
    displaying, in a display area of the terminal, the second information of the at least one first product, wherein the second information of the at least one first product is displayed at a position at which the second information is at least partially superimposed on the product area contained in the captured image being displayed by the display area of the terminal; and
    modifying the second information of the at least one first product based on user input manipulating the second information displayed by the display area of the terminal.

2. The information processing method according to claim 1, wherein a size of the at least one first product is included inside the product area.

3. The information processing method according to claim 1, further comprising:
    displaying, by a display of the terminal, the captured image;
    displaying, by the display, third information superimposed on the product area contained in the captured image being displayed by the display, the third information being based on the measurement data;
    changing the third information, based on input given by the user; and
    displaying, by the display, the changed third information.

4. The information processing method according to claim 1, further comprising:
    acquiring third information indicating a placement orientation of a second product that is to be placed in the product area; and
    notifying the user of the second information of the at least one first product and the third information indicating the placement orientation of the second product that is to be placed in the product area, based on first information of the plurality of products stored in the storage device.

5. The information processing method according to claim 1, further comprising:
    notifying the user of the second information of the at least one first product and third information indicating sizes of the plurality of products in response to a shape of one or more products of the plurality of products having changed, based on first information of the plurality of products stored in the storage device.

6. The information processing method according to claim 1, wherein the modifying of the second information of the at least one first product comprises:
rotating the second information of the at least one first product displayed by the display area of the terminal, based on input given by the user.

7. The information processing method according to claim 1,
wherein the storage device is a server; and
wherein the information processing method further comprises:
transmitting, to the server from the terminal, the measurement data; and
receiving, by the terminal from the server, the second information of the at least one first product that is selected, by the server based on the measurement data, from first information of the plurality of products stored in the storage device.

8. The information processing method according to claim 7, wherein the transmitting of the measurement data to the server causes the server to transmit third information of a size included inside the product area, to another terminal of a seller of a product whose information is stored in the server.

9. The information processing method according to claim 7, wherein the transmitting of the measurement data to the server causes the server to transmit, to a seller of the at least one first product, third information of the user, the at least one first product being selected based on the measurement data and size information of the plurality of products.

10. The information processing method according to claim 1,
wherein the measurement data obtained by measuring an area contained in the captured image is first measurement data; and
wherein the information processing method further comprises:
acquiring second measurement data obtained by measuring a second area in a product carrying-in route; and
notifying the user of third information indicating that the at least one first product fits through the product carrying-in route, the at least one first product being selected, based on the first measurement data and the second measurement data, from first information of the plurality of products stored in the storage device.

11. The information processing method according to claim 1, further comprising:
notifying the user of third information of a second product that is to be placed in another area different from the product area, the second product being selected, based on the measurement data, from first information of the plurality of products stored in the storage device.

12. The information processing method according to claim 1, wherein the acquiring of the measurement data comprises:
capturing, using an imaging device of the terminal, the captured image.

13. The information processing method according to claim 1,
wherein the storage device is a first server; and
wherein the acquiring of the measurement data comprises:
transmitting, to a second server from the terminal, the captured image; and
receiving, by the terminal from the second server, the measurement data, the measurement data having been obtained through measurement by the second server.

14. The information processing method according to claim 1, wherein the obtaining of the at least one first product that has been selected comprises:
obtaining the at least one first product that has been selected, based on the measurement data and a search word provided by the user of the terminal, from the plurality of products stored in the storage device.

15. A non-transitory computer-readable storage medium storing a program that, when executed by at least one processor of a terminal, causes the terminal to:
capture, using an imaging sensor of the terminal, an image comprising an area;
measure the area contained in the captured image to obtain measurement data of the area, the measurement data comprising at least one of a first distance in a first direction, a second distance in a second direction, and a third distance in a third direction, the first direction, the second direction, and the third direction being different from each other;
obtain at least one product that has been selected, based on the measurement data, from a plurality of products stored in a storage device, the at least one product having dimensions that fit the area contained in the captured image;
notify, a user of the terminal, of second information of the at least one product;
display, in a display area of the terminal, the second information of the at least one product, wherein the second information of the at least one product is displayed at a position at which the second information is at least partially superimposed on the area contained in the captured image being displayed by the display area of the terminal; and
modify the second information of the at least one product based on user input manipulating the second information displayed by the display area of the terminal.

16. The non-transitory computer-readable storage medium of claim 15, wherein the program, when executed by the at least one processor, further cause the terminal to:
obtain the at least one product that has been selected, based on the measurement data and a search word provided by the user of the terminal, from the plurality of products stored in the storage device.

17. A terminal for processing information, the terminal comprising:
an acquiring device configured to:
capture, using an imaging sensor of the terminal, an image comprising an area;
measure the area contained in the captured image to obtain measurement data of the area, the measurement data comprising at least one of a first distance in a first direction, a second distance in a second direction, and a third distance in a third direction, the first direction, the second direction, and the third direction being different from each other;
obtain at least one product that has been selected, based on the measurement data, from a plurality of products stored in a storage device, the at least one product having dimensions that fit the area contained in the captured image; and
a notifying device configured to:
notify, a user of the terminal, of second information of the at least one product;

display, in a display area of the terminal, the second information of the at least one product, wherein the second information of the at least one product is displayed at a position at which the second information is at least partially superimposed on the area contained in the captured image being displayed by the display area of the terminal; and modify the second information of the at least one product based on user input manipulating the second information displayed by the display area of the terminal.

18. A terminal for processing information, the terminal comprising:

a memory storing a program; and a processor configured to execute the program to:

capture, using an imaging sensor of the terminal, an image comprising an area;

measure the area contained in the captured image to obtain measurement data of the area, the measurement data comprising at least one of a first distance in a first direction, a second distance in a second direction, and a third distance in a third direction, the first direction, the second direction, and the third direction being different from each other;

obtain at least one product that has been selected, based on the measurement data, from a plurality of products stored in a storage device, the at least one product having dimensions that fit the area contained in the captured image;

notify, a user of the terminal, of second information of the at least one product;

display, in a display area of the terminal, the second information of the at least one product, wherein the second information of the at least one product is displayed at a position at which the second information is at least partially superimposed on the area contained in the captured image being displayed by the display area of the terminal; and modify the second information of the at least one product based on user input manipulating the second information displayed by the display area of the terminal.

19. The terminal to claim 18, wherein the processor is further configured to execute the program to:

obtain the at least one product that has been selected, based on the measurement data and a search word provided by the user of the terminal, from the plurality of products stored in the storage device.

* * * * *